United States Patent
Cavalcanti et al.

(10) Patent No.: US 12,506,568 B2
(45) Date of Patent: Dec. 23, 2025

(54) METHOD AND APPARATUS FOR FRAME PREEMPTION IN DOWNLINK COMMUNICATIONS FOR NEXT GENERATION Wi-Fi

(71) Applicant: Intel Corporation, Santa Clara, CA (US)

(72) Inventors: Dave Cavalcanti, Portland, OR (US); Juan Fang, Portland, OR (US); Mikhail Galeev, Beaverton, OR (US); Javier Perez-Ramirez, North Plains, OR (US); Laurent Cariou, Milizac (FR); Alexander Min, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 823 days.

(21) Appl. No.: 17/561,740

(22) Filed: Dec. 24, 2021

(65) Prior Publication Data

US 2022/0123880 A1    Apr. 21, 2022

(51) Int. Cl.
*H04L 5/00* (2006.01)
*H04L 1/00* (2006.01)

(52) U.S. Cl.
CPC .......... *H04L 5/0007* (2013.01); *H04L 1/0003* (2013.01); *H04L 1/0009* (2013.01); *H04L 5/0048* (2013.01)

(58) Field of Classification Search
CPC ... H04L 5/0007; H04L 1/0003; H04L 1/0009; H04L 5/0048; H04L 47/245; H04L 1/0041; H04W 72/569; H04W 28/065
See application file for complete search history.

(56) References Cited

U.S. PATENT DOCUMENTS

| | | | |
|---|---|---|---|
| 2010/0112960 A1* | 5/2010 | Shao | H04W 52/0225 455/73 |
| 2020/0367263 A1* | 11/2020 | Cavalcanti | H04W 72/12 |
| 2021/0337564 A1* | 10/2021 | Kwon | H04W 72/0446 |
| 2022/0330344 A1* | 10/2022 | Lou | H04L 5/0007 |
| 2023/0389069 A1* | 11/2023 | Ciochina-Kar | H04L 5/0048 |
| 2024/0106585 A1* | 3/2024 | Lou | H04L 5/0023 |

FOREIGN PATENT DOCUMENTS

| WO | WO-2020187031 A1 * | 9/2020 | H04L 1/0061 |
|---|---|---|---|
| WO | 2021036648 A1 | 3/2021 | |

OTHER PUBLICATIONS

English Translation of WO 2020187031 (Year: 2020).*
The extended European search report for European Application No. 22202376.4, dated Mar. 27, 2023, 9 pages.

* cited by examiner

*Primary Examiner* — Sun Jong Kim
(74) *Attorney, Agent, or Firm* — East IP P.C.

(57) ABSTRACT

Provided herein is a method and apparatus for frame preemption in downlink communications for next generation Wi-Fi. The disclosure provides an apparatus, comprising: interface circuitry; and processor circuitry coupled with the interface circuitry, wherein the processor circuitry is to: encode a Preemptable Physical Protocol Data Unit (P-PPDU) packet; and cause transmission of the P-PPDU packet to a Station (STA) via the interface circuitry, wherein the P-PPDU packet includes a plurality of MPDU segments of an Aggregated MPDU (A-MPDU), each MPDU segment includes one or more MPDUs, and wherein the P-PPDU packet includes a midamble (MA) for each MPDU segment. Other embodiments may also be disclosed and claimed.

18 Claims, 13 Drawing Sheets

1000 decode a P-PPDU packet received from an AP, wherein the P-PPDU packet includes a plurality of MPDU segments of an A-MPDU, each MPDU segment includes one or more MPDUs, and the P-PPDU packet includes a MA for each MPDU segment — 1010 determine, based on the MA, a target STA of a MPDU segment associated with the MA — 1020

METHOD AND APPARATUS FOR FRAME PREEMPTION IN DOWNLINK COMMUNICATIONS FOR NEXT GENERATION Wi-Fi

TECHNICAL FIELD

Embodiments of the present disclosure generally relate to wireless communication, and in particular, to methods and apparatus for frame preemption in downlink communications for next generation Wireless Fidelity (Wi-Fi).

BACKGROUND

Institute of Electrical and Electronics Engineers (IEEE) 802.1 Time-Sensitive Networking (TSN) standards are being developed to enable time synchronization, guarantee low latency and high reliability (primarily over wired/Ethernet links) through bandwidth reservation, time-aware scheduling and redundancy over Ethernet local area networks (LANs), and the like. It is required to consider TSN capabilities in IEEE 802.11 standards.

BRIEF DESCRIPTION OF THE DRAWINGS

Embodiments of the disclosure will be illustrated, by way of example and not limitation, in conjunction with the figures of the accompanying drawings in which like reference numerals refer to similar elements and wherein:

FIG. 10 is a schematic flowchart of a method for frame preemption in accordance with some embodiments of the disclosure.

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
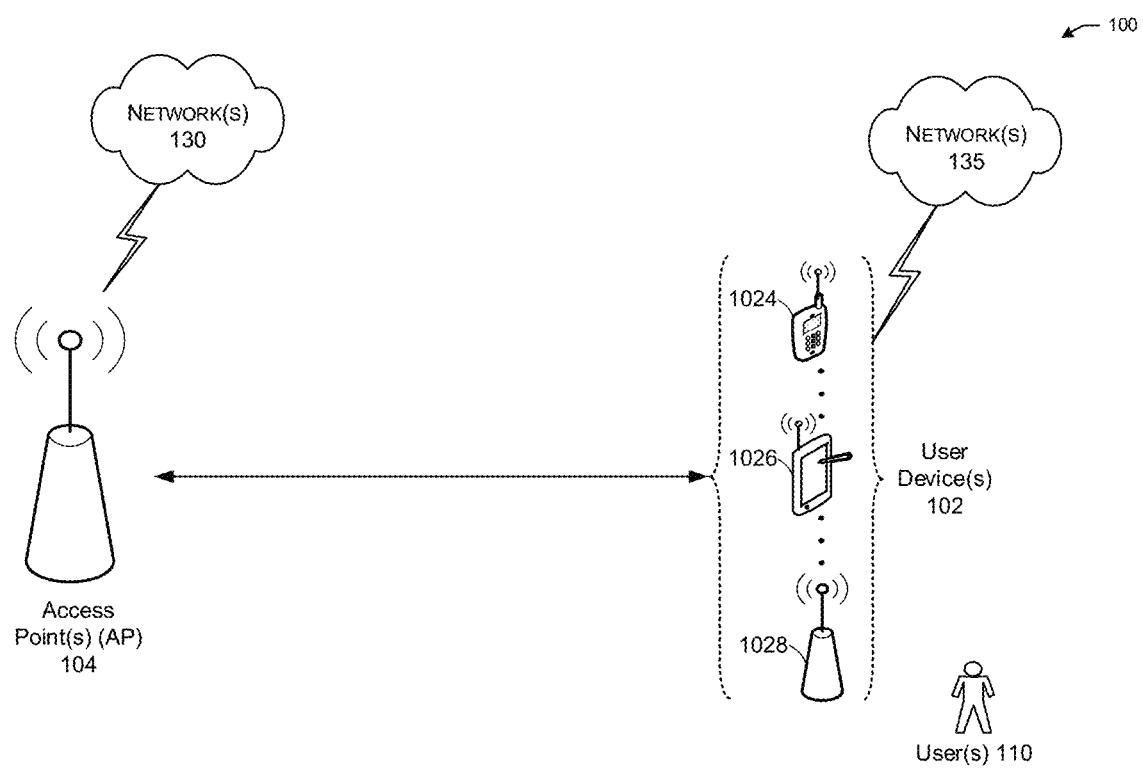
FIG. 1 is a network diagram illustrating an example network environment according to some embodiments of the disclosure.

FIG. 1 is a network diagram illustrating an example network environment according to some embodiments of the disclosure. As shown in FIG. 1, a wireless network 100 may include one or more user devices 102 and one or more access points (APs) 104, which may communicate in accordance with IEEE 802.11 communication standards. The user devices 102 may be mobile devices that are non-stationary (e.g., not having fixed locations) or may be stationary devices.

Figure 11:
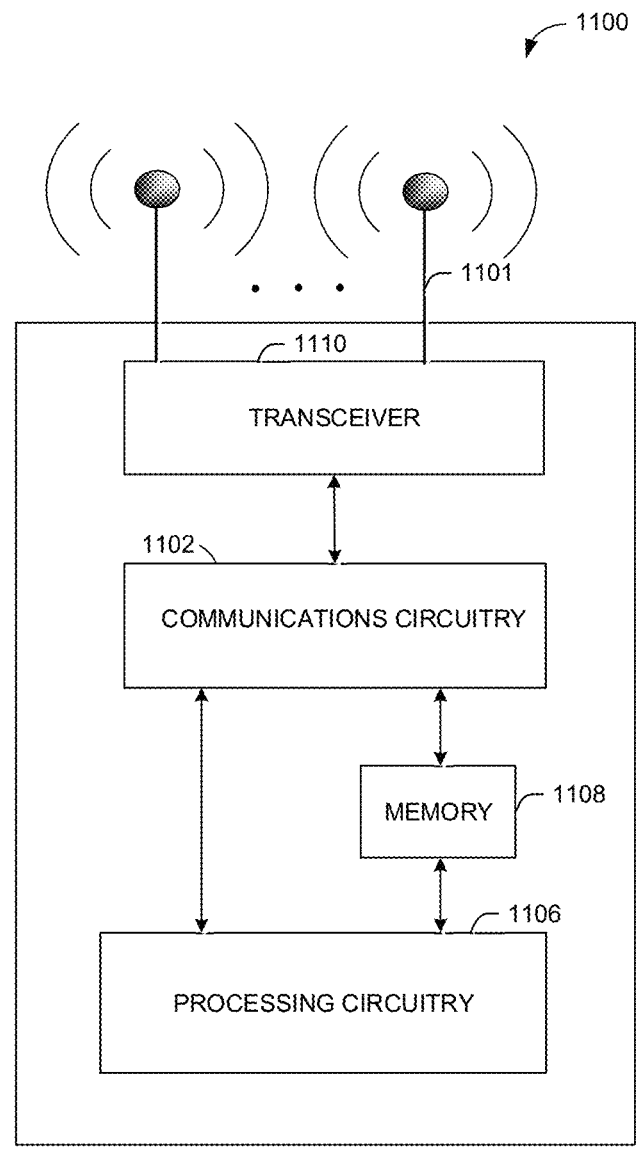
FIG. 11 is a functional diagram of an exemplary communication station in accordance with one or more example embodiments of the disclosure.
Figure 12:
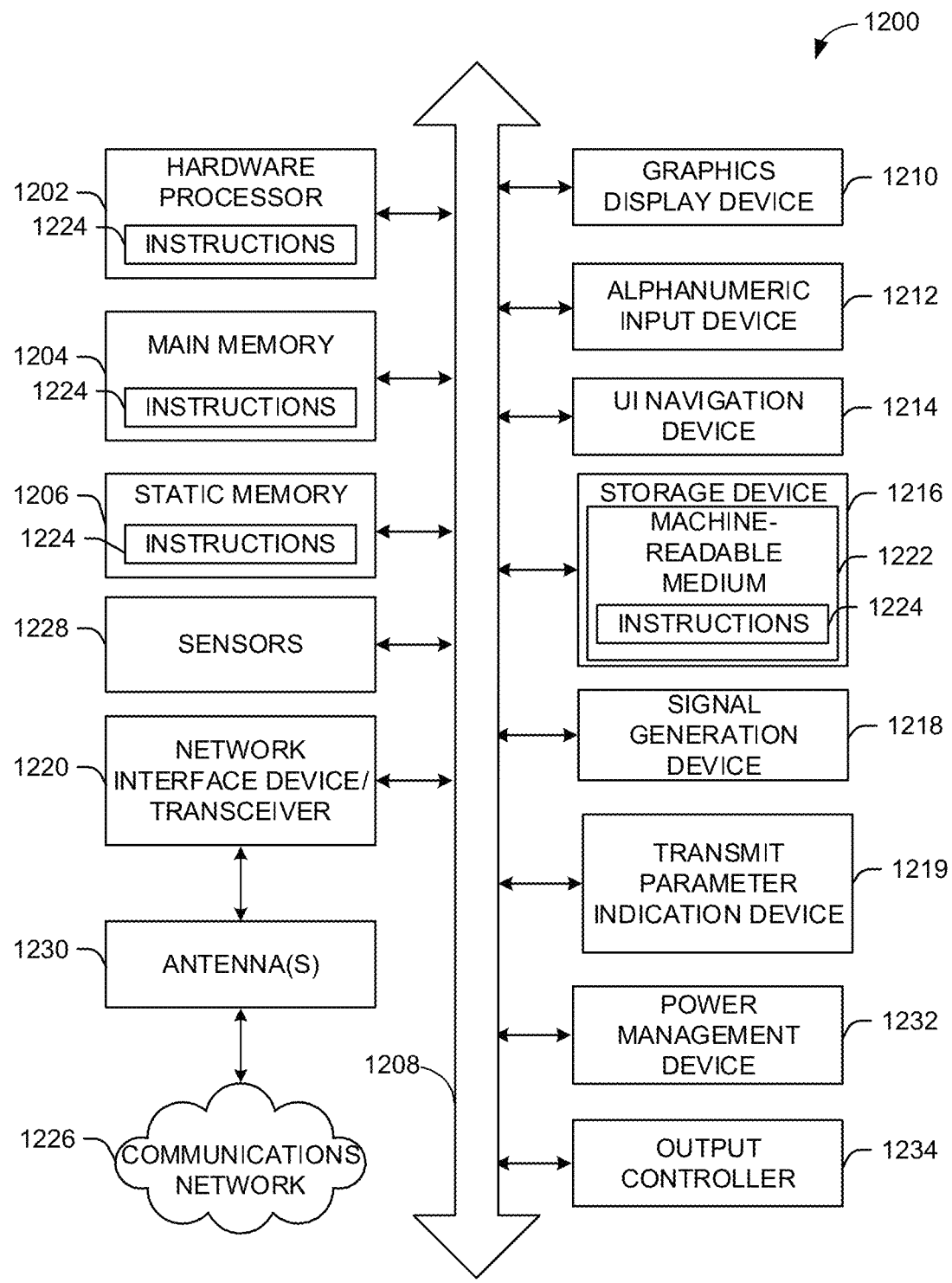
FIG. 12 is a block diagram of an example of a machine or system upon which any one or more of the techniques (e.g., methodologies) discussed herein may be performed.

In some embodiments, the user devices 102 and APs 104 may include one or more function modules similar to those in the functional diagram of FIG. 11 and/or the example machine/system of FIG. 12.

The one or more user devices 102 and/or APs 104 may be operable by one or more users 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more user devices 102 and the one or more APs 104 may be STAs. The one or more user devices 102 and/or APs 104 may operate as a personal basic service set (PBSS) control point/access point (PCP/AP). The user devices 102 (e.g., 1024, 1026, or 1028) and/or APs 104 may include any suitable processor-driven device including, but not limited to, a mobile device or a non-mobile, e.g., a static device. For example, the user devices 102 and/or APs 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a personal digital assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communications service (PCS) device, a PDA device which incorporates a wireless communication device, a mobile or portable global positioning system (GPS) device, a digital video broadcasting (DVB) device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user devices 102 and/or APs 104 may also include mesh stations in, for example, a mesh network, in accordance with one or more IEEE 802.11 standards and/or 3GPP standards.

Any of the user devices 102 (e.g., user devices 1024, 1026, 1028) and APs 104 may be configured to communicate with each other via one or more communications networks 130 and/or 135 wirelessly or wired. The user devices 102 may also communicate peer-to-peer or directly with each other with or without APs 104. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 102 (e.g., user devices 1024, 1026, 1028) and APs 104 may include one or more communications antennas. The one or more communications antennas may be any suitable type of antennas corresponding to the communications protocols used by the user devices 102 (e.g., user devices 1024, 1026 and 1028) and APs 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (IMO) antennas, omnidirectional antennas, quasi-omnidirectional antennas, or the like. The one or more communications antennas may be communicatively coupled to a radio component to transmit and/or receive signals, such as communications signals to and/or from the user devices 102 and/or APs 104.

Any of the user devices 102 (e.g., user devices 1024, 1026, 1028) and APs 104 may be configured to perform directional transmission and/or directional reception in conjunction with wirelessly communicating in a wireless network. Any of the user devices 102 (e.g., user devices 1024, 1026, 1028) and APs 104 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user devices 102 (e.g., user devices 1024, 1026, 1028) and APs 104 may be configured to perform any given directional transmission towards one or more defined transmit sectors. Any of the user devices 102 (e.g., user devices 1024, 1026, 1028) and APs 104 may be configured to perform any given directional reception from one or more defined receive sectors.

IMO beamforming in a wireless network may be accomplished using radio frequency (RF) beamforming and/or digital beamforming. In some embodiments, in performing a given IMO transmission, the user devices 102 and/or APs 104 may be configured to use all or a subset of its one or more communications antennas to perform MIMO beamforming.

Any of the user devices 102 (e.g., user devices 1024, 1026, 1028) and APs 104 may include any suitable radio and/or transceiver for transmitting and/or receiving radio frequency (RF) signals in the bandwidth and/or channels corresponding to the communications protocols utilized by any of the user devices 102 and APs 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

IEEE 802.1 TSN standards are being developed to enable time synchronization, guarantee low latency and high reliability (primarily over wired/Ethernet links) through bandwidth reservation, time-aware scheduling and redundancy over Ethernet LANs, and the like. It is required to consider TSN capabilities in IEEE 802.11 standards. Some TSN capabilities have already been extended to IEEE 802.11: time synchronization (IEEE 802.1AS over IEEE 802.11 defined in IEEE 802.11-2012) and IEEE 802.1Qbv (Time-Aware Traffic Shaping over IEEE 802.11). Real Time Applications Topic Interest Group (RTA-TIG) is investigating the requirements and issues to control latency and increase reliability for real time applications including gaming, robotics, and industrial automation.

Frame-preemption is another TSN capability, which enables an Ethernet TSN device to preempt an ongoing Best Effort (BE) transmission and start transmission of an incoming TSN frame. Frame-preemption is defined in IEEE 802.1Qbu TSN standard with Ethernet medium access control (MAC)/physical layer (PHY) support defined by IEEE 802.3br. Frame-preemption and other TSN capabilities are also being defined as part of fifth generation (5G) Ultra Reliable Low Latency Communication (URLLC) mode.

This disclosure describes methods and mechanisms to enable frame preemption in next generation IEEE 802.11/Wi-Fi, e.g., supported in MAC/PHY, which may be developed as part of the new Extremely High Throughput (EHT) group.

Figure 2:
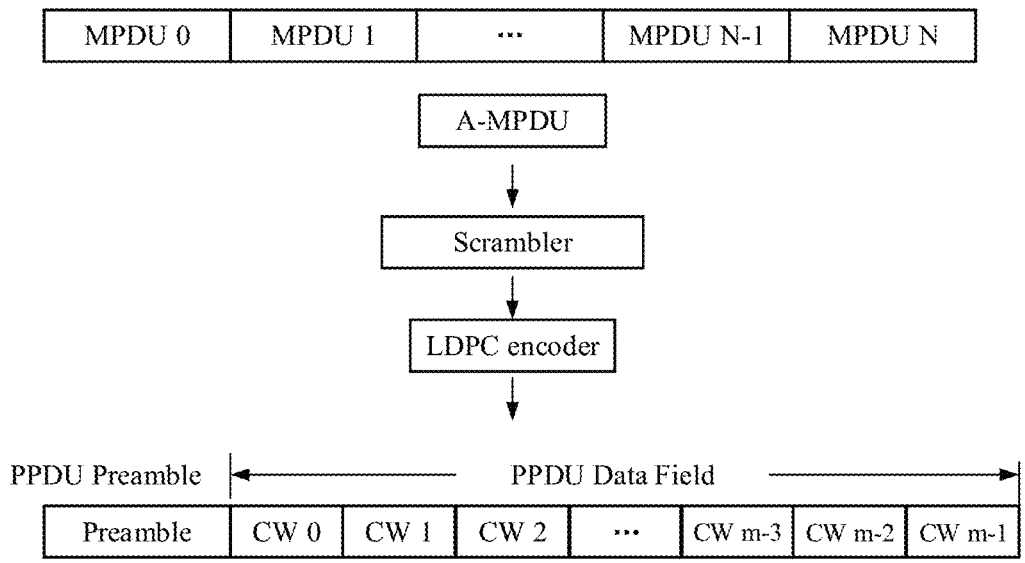
FIG. 2 illustrates a frame aggregation in lower medium access control (MAC) in accordance with some embodiments of the disclosure.

To increase the overall throughput of Wi-Fi devices, frame aggregation (e.g., Aggregated MAC Protocol Data Unit (MPDU) (A-MPDU)) was introduced in IEEE 802.11n and subsequent standards. FIG. 2 illustrates a frame aggregation in lower MAC in accordance with some embodiments of the disclosure.

As shown in FIG. 2, MPDUs 1-N are aggregated to be an A-MPDU. The A-MPDU is scrambled via a scrambler and encoded via a Low Density Parity Check (LDPC) encoder. The formed physical protocol data unit (PPDU) may include a preamble and a data field which includes several code words (CWs), e.g., CWs 0-M−1. Aggregation happens in the MAC layer, making PPDU data payload much bigger. Although frame aggregation helps improve throughput and average latency, it may result in a much higher worst case latency. For example, time-sensitive frames may experience higher latency if it arrives right before or during the transmission of a long A-MPDU. For example, the PPDU preamble may be up to 52 us, the PPDU data field may be up to 5.4 ms. Other length may be applicable, which is not limited in the disclosure.

In IEEE 802.11ax, orthogonal frequency division multiple access (OFDMA) was introduced to improve spectrum usage by allowing multiple stations to simultaneously transmit (or receive) PPDUs to (or from) their corresponding APs. For downlink (DL) communications, an AP may send data packets to participating STAs using different resource units (RUs).

Figure 3:
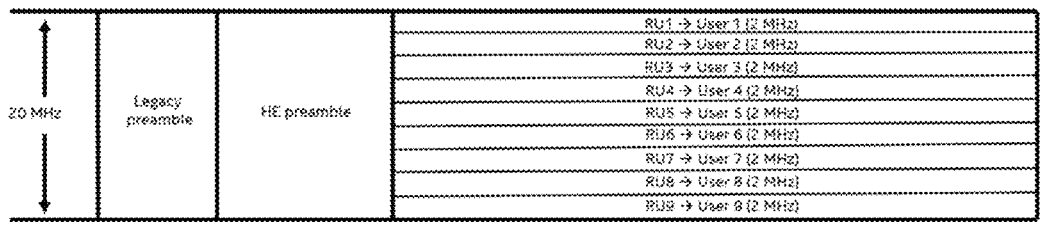
FIG. 3 illustrates a physical protocol data unit (PPDU) orthogonal frequency division multiple access (OFDMA) frame structure supporting multiple users in accordance with some embodiments of the disclosure.

FIG. 3 illustrates a PPDU OFDMA frame structure supporting multiple users in accordance with some embodiments of the disclosure. As shown in FIG. 3, a downlink PPDU frame (e.g., an 802.11ax downlink PPDU frame) is used to communicate with 9 STAs, for example. Data may be sent using channel bandwidth as low as 2 MHz. Each user is assigned with a respective RU. As shown in FIG. 3, the PPDU may include a legacy preamble, a High Energy (HE) preamble and a data portion. Such a PPDU OFDMA frame structure does not allow a PPDU to be preempted to transmit a time-sensitive frame.

The frame preemption capability may achieve worst case latency guarantees with high efficiency, as it eliminates the need for un-used times (guard bands) around reserved service period for time-sensitive applications (e.g., as defined by the IEEE 802.1Qbv over IEEE 802.11 mechanism). With frame preemption capabilities, the AP may transmit more BE traffic as it can preempt the transmission only when needed to transmit a time-sensitive frame.

Some mechanisms of frame preemption are included in IEEE 802.1Qbu for Ethernet. However, direct adoption of IEEE 802.1Qbu standard over Wi-Fi is not feasible since it requires support at IEEE 802.11 MAC and PHY layers.

Low latency and reliable communications are some of the main gaps in existing Wi-Fi radios (including IEEE 802.11ax) and there is an opportunity to address these problems in the next generation EHT Wi-Fi and/or a new group as a result of the RTA-TIG exploration. In some applications such as industrial Internet of Things (IOT) and gaming, transmission of time-sensitive packets is required to satisfy good Quality of Service (QoS) and user experience. The mechanisms disclosed herein can facilitate the fulfillment of these latency requirements and enable Wi-Fi to be used in these time-sensitive use cases with high efficiency.

In some embodiments, STAs with time-sensitive data or preemptable data (e.g, the data that can be interrupted by time-sensitive data) streams will request access with certain QoS requirements (e.g. defined in a traffic specification) that characterizes the latency and reliability requirements. The AP would, therefore, be aware of time-sensitive traffic streams and may schedule data stream transmissions in order to meet the requirements.

As mentioned above, frame preemption in next generation IEEE 802.11/Wi-Fi proposed in the disclosure may support in both of PHY layer and MAC layer. Below, PHY layer frame preemption will be first described.

A preemptable PPDU (P-PPDU) frame format is proposed in the disclosure. It allows the insertion of time-sensitive high reliable communications (time-sensitive data) within a PPDU for DL transmissions. To allow preemption, an A-MPDU may be divided into several MPDU segments, each formed by an integer number of MPDUs. Additionally, in some embodiments, each MPDU segment may be separately scrambled and encoded. Encoded MPDU segments may be combined together to form a P-PPDU. Before combining, a midamble (MA) may be prepended for each encoded MPDU segment.

Figure 4:
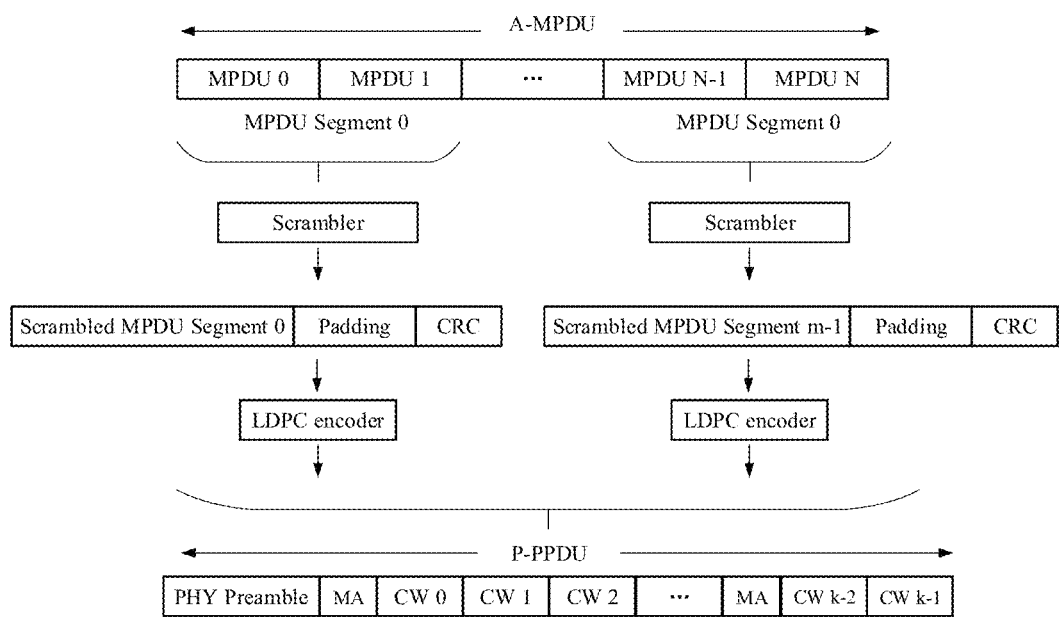
FIG. 4 illustrates a single user (SU) preemptable PPDU (P-PPDU) construction in accordance with some embodiments of the disclosure.

FIG. 4 illustrates a single user (SU) preemptable PPDU (P-PPDU) construction in accordance with some embodiments of the disclosure. FIG. 4 shows an example of how segments are created, encoded and combined to form a P-PPDU. For example, each MPDU segment is created with an integer number of MPDUs from an A-MPDU. Each MPDU segment may be scrambled via a scrambler and encoded via a LDPC encoder. During the scrambling, some bits are padded and some bits are used for Cyclic Redundancy Check (CRC). The formed P-PPDU may include a PHY preamble and a data portion which includes several MAs each of which corresponds to a respective MPDU segment. Each MPDU segment may be associated with a number of CWs.

The proposed P-PPDU frame format may also be applicable in multi user (MU) downlink communications. In some embodiments, each STA in a P-PPDU transmission may define different segment sizes. As a result, MAs corresponding to the STAs might not be aligned at an OFDMA symbol level. In some embodiments, MAs corresponding to the STAs might be aligned at an OFDMA symbol level. The disclosure is not limited in this respect.

Figures 5, 6:
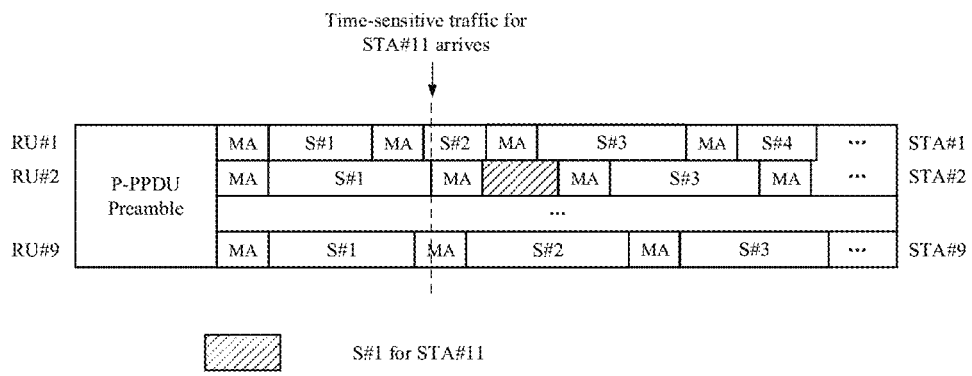
FIG. 5 illustrates a multi user (MU) P-PPDU construction in accordance with some embodiments of the disclosure.
FIG. 6 illustrates a MU PPDU frame preemption in a resource unit (RU) level in accordance with some embodiments of the disclosure.

FIG. 5 illustrates a MU P-PPDU construction in accordance with some embodiments of the disclosure. In some embodiments, the transmitter (AP) may decide segment size for each DL STA and prepend an MA to each segment (denoted as S as shown in FIG. 5) after scrambling and encoding. In some embodiments, the MU frame does not require alignment of MAs corresponding to the STAs participating in the P-PPDU, as shown in FIG. 5. In some embodiments, MAs corresponding to the STAs participating in the P-PPDU may align with each other for easier scheduling. The disclosure is not limited in this respect.

In some embodiments, the STAs may be assigned with respective RUs. As shown in FIG. 5, STA 1 is assigned with RU 1, STA 2 is assigned with RU 2, and so on. In another example, each STA may be assigned with more than one RUs, which is not limited in the disclosure.

Below, different preemption modes will be described for the MU P-PPDU, e.g., the MU P-PPDU shown in FIG. 5.

In some embodiments, frame preemption may be performed on a RU-level, which may be referred to as RU-level frame preemption. In some embodiments, frame preemption may be performed on a wideband-level, which may be referred to as wideband-level frame preemption.

In some embodiments, preemptable STAs may be pooled into different resource allocations of a PPDU, e.g., different RUs. Herein, a preemptable STA is a STA that can be interrupted by time-sensitive data from a higher priority STA or preemptible STA. Herein, a preemptible STA (or referred to as time-sensitive STAs) is a STA that supports time-sensitive traffic using a P-PPDU packet, so that the preemptible STA can interrupt current transmission of a preemptable STA to inject the time-sensitive traffic in the P-PPDU packet. In some embodiments, a STA may be both preemptable STA and preemptible STA.

In some embodiments, the AP may assign STAs from the pools to populate respective RUs before a P-PPDU transmission. However, a pooled STA corresponding to a RU may always decode the MA field, which indicates if preemption is happening and contains the information to indicate if any of the pooled STAs is a recipient of a time-sensitive packet (more details on MA frame format will be described below).

In some embodiments, P-PPDU resource allocation remains the same after insertion of time-sensitive traffic. In some embodiments, a new P-PPDU resource allocation is required after insertion of time-sensitive traffic.

FIG. 6 illustrates a MU PPDU frame preemption in a RU level in accordance with some embodiments of the disclosure. As shown in FIG. 6, the P-PPDU is constructed to serve STA #1~9, for example, with RUs 1~9 (e.g., 2 MHz) respectively. STA #10~18 may be pooled to RUs 1~9 respectively. For example, STA #11 may be pooled with STA #2 in RU #2. When time-sensitive data needs to be transmitted to STA #11, a MA (e.g., the recent MA) associated with RU #2 may indicate the presence of time-sensitive data for STA #11. STA #2 may read the MA and pauses to process the received P-PPDU until the end of the segment for the STA #11 (e.g., S #1 for the STA #11 as shown in FIG. 6). After STA #11 receives the time-sensitive data, STA #2 may resume the processing of the subsequent segments (e.g., S #2, S #3, etc.).

As shown in FIG. 6, P-PPDU resource allocation remains the same. However, in some other examples, a new P-PPDU resource allocation is required after insertion of time-sensitive traffic. The disclosure is not limited in this respect.

In some embodiments where wideband-level frame preemption is applied, a wide band MA (WMA) may be used to signal preemptable STAs that the current P-PPDU transmission will be preempted. Additionally or alternatively, the WMA may be used to indicate new resource allocation for (time-sensitive) data transmission to a new set of preemptable STAs. More details on the WMA will be described below.

Figure 7:
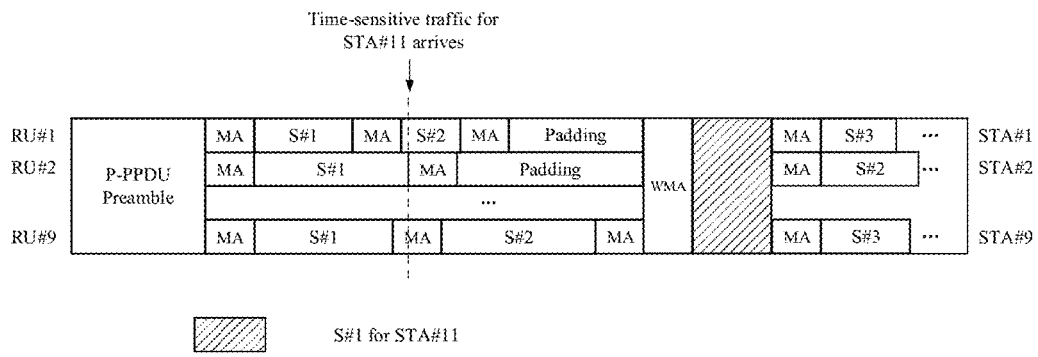
FIG. 7 illustrates a MU PPDU frame preemption in a wideband level in accordance with some embodiments of the disclosure.

FIG. 7 illustrates a MU PPDU frame preemption in a wideband level in accordance with some embodiments of the disclosure. As shown in FIG. 7, the P-PPDU is constructed to serve STA #1~9, for example, with RUs 1~9 (e.g., 2 MHz) respectively. When time-sensitive traffic arrives, padding is added after a MA(s) to align the next MAs of all STAs at an OFDMA symbol level to enable the insertion of a WMA. Padding is added properly so that no segment transmission is interrupted unexpectedly. Preemptible STAs (e.g., STA #10~18) not being served in current P-PPDU may either choose to periodically read a MA corresponding to a STA to detect preemption, or directly detect the presence of a WMA. In some embodiments, all preemptable STAs may decode the WMA which contains information about the new RU allocation and assignment and length of transmitted segment. After transmission of time-sensitive data packets is completed, data transmission to initial set of STAs (e.g., the preemptable STA #1~9) is resumed.

In the example of FIG. 7, the frame preemption is based on a new RU allocation. The time-sensitive data packet arrives at the end of transmission of S #1 for STA #2. The AP may generate new dummy segments (padding) to wait for other STAs to finalize their segment transmissions and align all MAs at an OFDMA symbol level. WMA is inserted to signal all preemptable STAs. After the transmission of the WMA is completed, the time-sensitive data packet is transmitted, for example, S #1 for STA #11, across the wideband of the P-PPDU. After transmission of time-sensitive data packets is completed, MAs associated with each of the preemptable STAs may be transmitted based on the new RU allocation. For example, these MAs are transmitted simultaneously.

In some embodiments, preempted traffic is resumed by inserting a MA based on each of the original RU allocations.

FIG. 7 shows an example where a single STA is scheduled for reception of time-sensitive traffic. However, in some embodiments, multiple STAs may be scheduled for reception of time-sensitive traffic in a same P-PPDU.

Figure 8:
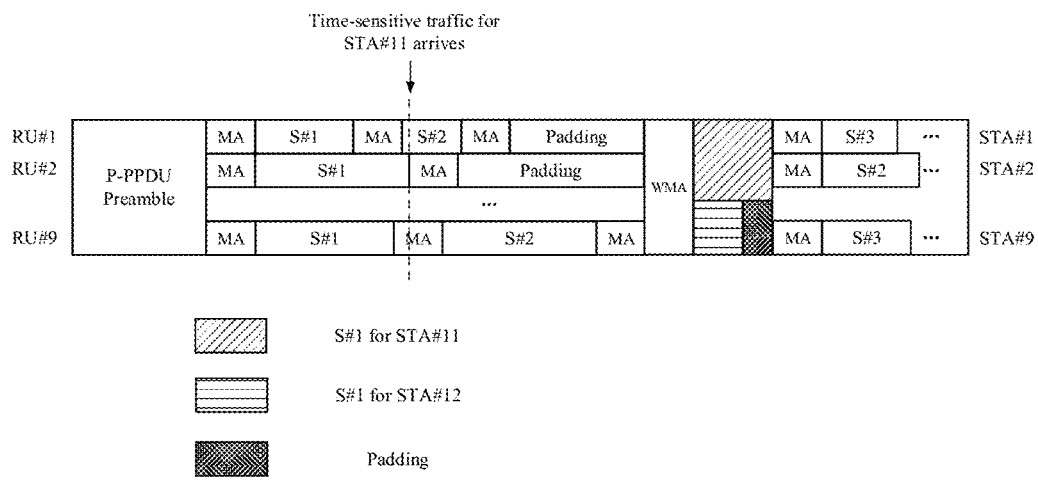
FIG. 8 illustrates a MU PPDU frame preemption in a wideband level in accordance with some embodiments of the disclosure.

In some embodiments, the AP may pad time-sensitive segment(s) to match the length of longest time-sensitive segment. This guaranties alignment of all STAs at an OFDMA symbol right after all time-sensitive data has been sent FIG. 8 illustrates a MU PPDU frame preemption in a wideband level in accordance with some embodiments of the disclosure. As shown in FIG. 8, after the transmission of the WMA is completed, time-sensitive data packets are sent to STAs #11 and #12 respectively. S #1 for STA #12 is padded to align with S #1 for STA #11 before BE data transmission to STAs 1~9 is resumed In the example of FIG. 8, the frame preemption is based on a new RU allocation. However, in some embodiments, preempted traffic is resumed by inserting a MA based on each of the original RU allocations.

The frame preemption mechanisms are described above in conjunction with MU P-PPDU frame structure. However, SU P-PPDU frame structure may also support frame preemption mechanisms, which is similar to the MU PPDU frame preemption in a RU level to some extent, which will not be detailed herein.

In some embodiments, the MA field may include at least one of:
  Delimiter signature. Defined per RU. This field is used to detect the presence of MA and may be used in case previous MA was decoded in error.
  SIG Field. Modulated using Binary Convolutional Codes (BCC) with Modulation and Coding Scheme (MCS) 0.
  STA Identifier (ID). Identification field to address STA recipient of BE/time-sensitive data.
  Segment Length. Length of next segment containing an integer number of MPDUs. This field is used to notify STAs when the next MA is expected to arrive.
  Preemption Bits. Bits used to indicate frame preemption type to STAs pooled to a particular RU. This field indicates whether there is RU level or wideband level preemption.
  Padding bit. Bit used to indicate padding before insertion of WMA.
  MCS. Field used to indicate coding and modulation scheme of next transmission.
  CRC bits. Field used to detect decoding error.
  BCC padding bits: Padding bits required to flush BCC.

In some embodiments, the MA field may include different fields, which is not limited in the disclosure.

In some embodiments, the WMA field may include at least one of:
  Training field. Training field to allow all preemptable STAs to perform wideband channel estimation.
  SIG Field. Modulated using BCC with MCS 0.
  User info field. Field to indicate new RU allocation, modulation and coding scheme, frame length and other related transmission parameters for the packet reception.
  Max segment length. Maximum length of all transmitted segments. This field is used by STAs to compute the amount of padding the AP is adding to enable MA alignment after time-sensitive data has been sent.
  MCS. Field used to indicate coding and modulation scheme of next transmission.
  CRC bits. Field used to detect decoding error.
  BCC padding bits: Padding bits required to flush BCC.

In some embodiments, the MA field may include different fields, which is not limited in the disclosure.

As mentioned above, the frame preemption mechanism of the disclosure is not only supported by PHY layer, but also MAC layer. In order to enable frame preemption, the MAC layer may identify time-sensitive frames, which may be based on traffic identifier (TID) or other traffic stream identification methods already available in the standard. Furthermore, a new procedure is required to enable the MAC layer to signal to the PHY layer that a PPDU needs to be preempted to enable the transmission of a time-sensitive frame. In some embodiment, a dedicated MAC queue may be used for time-sensitive frames. This queue may be controlled by a time-aware shaper (e.g. IEEE 802.1Qbv) to enable a transmission at a pre-defined time (e.g., defined by a schedule). Once the time-sensitive frame is ready for transmission, the MAC layer will check if there is an ongoing transmission and decide if there is enough time to preempt the transmission. If MAC layer decide to preempt the transmission, it will signal the preemption to the PHY layer (a new primitive may be defined at the MAC/PHY layer interface) and provide the time-sensitive frame as a parameter, for example. If there is no ongoing transmission at the time when the time-sensitive frame needs to be transmitted, the MAC layer may follow its normal operation mode.

Figure 9:
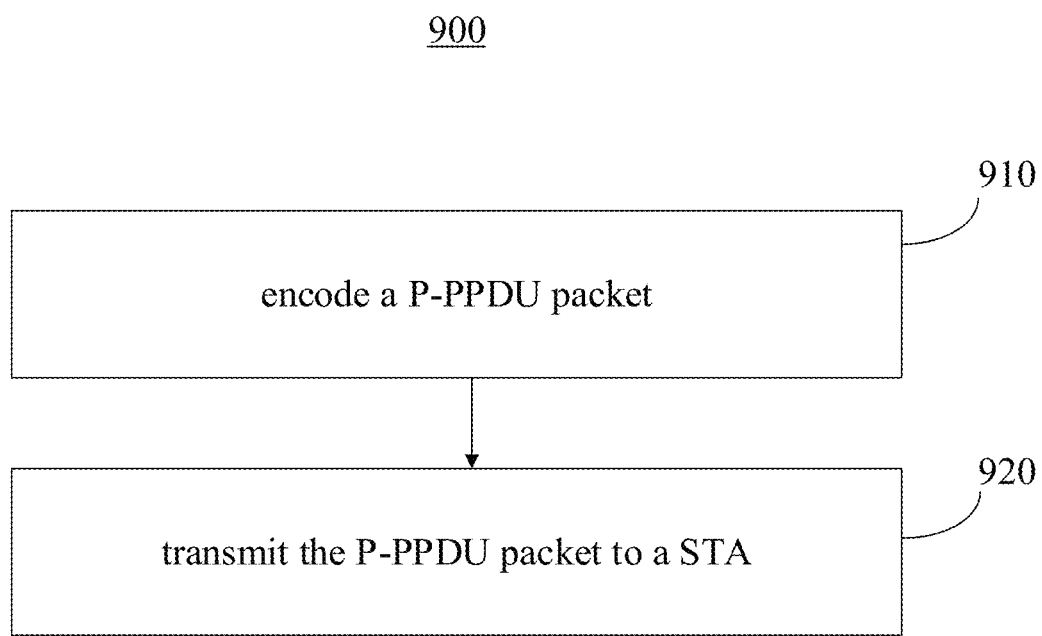
FIG. 9 is a schematic flowchart of a method for frame preemption in accordance with some embodiments of the disclosure.

FIG. 9 is a schematic flowchart of a method 900 for frame preemption in accordance with some embodiments of the disclosure. The method 900 may include steps 910 and 920 and performed by an AP.

At step 910, a P-PPDU packet is encoded. The P-PPDU packet includes a plurality of MPDU segments of an A-MPDU, each MPDU segment includes one or more MPDUs, and the P-PPDU packet includes a MA for each MPDU segment.

At step 920, the P-PPDU packet is transmitted to a STA.

The method 900 may include more or less or different steps, which is not limited in this respect.

In some embodiments, transmission of a MPDU segment of the P-PPDU packet is postpone when time-sensitive traffic arrives, and the time-sensitive traffic is inserted in the P-PPDU packet for transmission to a requesting STA of the time-sensitive traffic.

In some embodiments, a request from the requesting STA is decoded, and the postponing and inserting is scheduled in response to the request. The request may include a latency and reliability requirement for the time-sensitive traffic.

In some embodiments, the MA may include: a preemption field to indicate a type of a preemption; a STAID field to indicate a STA for which a MPDU segment associated with the MA is assigned; a segment length field to indicate a length of a MPDU segment associated with the MA; a MCS field to indicate a coding and modulation scheme for a MPDU segment associated with the MA; a padding field to indicate padding before insertion of a WMA; a CRC field to detect decoding error; a BCC padding field to flush BCC; or a delimiter signature field to detect presence of the MA.

In some embodiments, the MPDU segment associated with the MA includes either time-sensitive traffic or non-time-sensitive traffic.

In some embodiments, the P-PPDU packet is associated with a single STA.

In some embodiments, the P-PPDU packet is associated with multiple STAs based on OFDMA, and wherein each of the multiple STAs is assign with a respective RU in frequency domain.

In some embodiments, the MA is to include a preemption field to indicate a type of a preemption. The type of the preemption includes a RU based preemption or a wideband based preemption.

In some embodiments, the P-PPDU packet includes multiple A-MPDUs, and each of the multiple STAs is associated with a respective one of the multiple A-MPDUs.

In some embodiments, the P-PPDU packet further includes a WMA across the P-PPDU packet in the frequency domain.

In some embodiments, the WMA is associated with one or more STAs.

In some embodiments, the WMA may include: a training field to allow a STA to perform wideband channel estimation; a user information field to indicate a RU allocation, a coding and modulation scheme, or a frame length for a MPDU segment associated with the WMA; a maximum segment length field to indicate a maximum length among MPDU segments associated with the WMA; a MCS field to indicate a coding and modulation scheme for a MPDU segment associated with the WMA; a CRC field to detect decoding error; or a BCC padding field to indicate padding bits required to flush BCC.

In some embodiments, the MPDU segment associated with the WMA includes time-sensitive traffic.

In some embodiments, a MAC logic of the AP may arrange a time-sensitive frame into a queue, and provide, when the time-sensitive frame is ready for transmission and the P-PPDU packet is ongoing, the time-sensitive frame as a parameter to a PHY logic of the AP via a dedicated primitive. In some embodiments, the PHY logic may preempt the P-PPDU packet to insert the time-sensitive frame.

FIG. 10 is a schematic flowchart of a method 1000 for frame preemption in accordance with some embodiments of the disclosure. The method 1000 may include steps 1010 and 1020 and performed by a STA.

At step 1010, a P-PPDU packet received from an AP is decoded. The P-PPDU packet includes a plurality of MPDU segments of an A-MPDU, each MPDU segment includes one or more MPDUs, and the P-PPDU packet includes a MA for each MPDU segment.

At step 1020, based on the MA, a target STA of a MPDU segment associated with the MA is determined.

The method 1000 may include more or less or different steps, which is not limited in this respect.

In some embodiments, a request for time-sensitive traffic is encode, the request is transmitted to the AP, and in response to the request, the P-PPDU packet is decoded for the time-sensitive traffic.

In some embodiments, the MPDU segment associated with the MA includes the time-sensitive traffic. In some embodiments, processing of the P-PPDU packet is paused when the MA indicates that the MPDU segment associated with the MA includes time-sensitive traffic.

The method 1000 may be understood in conjunction with the embodiments of method 900 and other embodiments of the disclosure, which is not repeated herein.

The frame preemption mechanism of the disclosure enables the transmission of preemptable data along with time-sensitive data packets within the same PPDU. In this way, low priority traffic streams (preemptable data) can be served with the capability of interrupting it if time-sensitive data arrives. Once the transmission of the time-sensitive packet is completed, the interrupted PPDU transmission resumes. As a result, it can be achieved better QoS, low worst case latency and high reliable transmission with high efficiency.

FIG. 11 shows a functional diagram of an exemplary communication station 1100, in accordance with one or more example embodiments of the disclosure. In one embodiment, FIG. 11 illustrates a functional block diagram of a communication station that may be suitable for use as the AP 104 (FIG. 1) or the user device 102 (FIG. 1) in accordance with some embodiments. The communication station 1100 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1100 may include communications circuitry 1102 and a transceiver 1110 for transmitting and receiving signals to and from other communication stations using one or more antennas 1101. The communications circuitry 1102 may include circuitry that can operate the physical layer (PHY) communications and/or medium access control (MAC) communications for controlling access to the wireless medium, and/or any other communications layers for transmitting and receiving signals. The communication station 1100 may also include processing circuitry 1106 and memory 1108 arranged to perform the operations described herein. In some embodiments, the communications circuitry 1102 and the processing circuitry 1106 may be configured to perform operations detailed in the above figures, diagrams, and flows.

In accordance with some embodiments, the communications circuitry 1102 may be arranged to contend for a wireless medium and configure frames or packets for communicating over the wireless medium. The communications circuitry 1102 may be arranged to transmit and receive signals. The communications circuitry 1102 may also include circuitry for modulation/demodulation, upconversion/downconversion, filtering, amplification, etc. In some embodiments, the processing circuitry 1106 of the communication station 1100 may include one or more processors. In other embodiments, two or more antennas 1101 may be coupled to the communications circuitry 1102 arranged for transmitting and receiving signals. The memory 1108 may store information for configuring the processing circuitry 1106 to perform operations for configuring and transmitting message frames and performing the various operations described herein. The memory 1108 may include any type of memory, including non-transitory memory, for storing information in a form readable by a machine (e.g., a computer). For example, the memory 1108 may include a computer-readable storage device, read-only memory (ROM), random-access memory (RAM), magnetic disk storage media, optical storage media, flash-memory devices and other storage devices and media.

In some embodiments, the communication station 1100 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1100 may include one or more antennas 1101. The antennas 1101 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1100 may include one or more of a keyboard, a display, a non-volatile memory port, multiple antennas, a graphics processor, an application processor, speakers, and other mobile device elements. The display may be a liquid crystal display (LCD) screen including a touch screen.

Although the communication station 1100 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1100 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1100 may include one or more processors and may be configured with instructions stored on a computer-readable storage device.

FIG. 12 illustrates a block diagram of an example of a machine or system 1200 upon which any one or more of the techniques (e.g., methodologies) discussed herein may be performed. In other embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environments. The machine 1200 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a power management device 1232, a graphics display device 1210, an alphanumeric input device 1212 (e.g., a keyboard), and a user interface (UI) navigation device 1214 (e.g., a mouse). In an example, the graphics display device 1210, alphanumeric input device 1212, and UI navigation device 1214 may be a touch screen display. The machine 1200 may additionally include a storage device (i.e., drive unit) 1216, a signal generation device 1218 (e.g., a speaker), a transmit parameter indication device 1219, a network interface device/transceiver 1220 coupled to antenna(s) 1230, and one or more sensors 1228, such as a global positioning system (GPS) sensor, a compass, an accelerometer, or other sensor. The machine 1200 may include an output controller 1234, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 1202 for generation and processing of the baseband signals and for controlling operations of the main memory 1204, the storage device 1216, and/or the transmit parameter indication device 1219. The baseband processor may be provided on a single radio card, a single chip, or an integrated circuit (IC).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

The transmit parameter indication device 1219 may carry out or perform any of the operations and processes (e.g., methods 400, 500 and 600) described and shown above.

It is understood that the above are only a subset of what the transmit parameter indication device 1219 may be configured to perform and that other functions included throughout this disclosure may also be performed by the transmit parameter indication device 1219.

While the machine-readable medium 1222 is illustrated as a single medium, the term "machine-readable medium" may include a single medium or multiple media (e.g., a centralized or distributed database, and/or associated caches and servers) configured to store the one or more instructions 1224.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1200 and that cause the machine 1200 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device/transceiver 1220 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1220 may include one or more physical jacks (e.g., Ethernet, coaxial, or phone jacks) or one or more antennas to connect to the communications network 1226. In an example, the network interface device/transceiver 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1200 and includes digital or analog communications signals or other intangible media to facilitate communication of such software.

Figure 13:
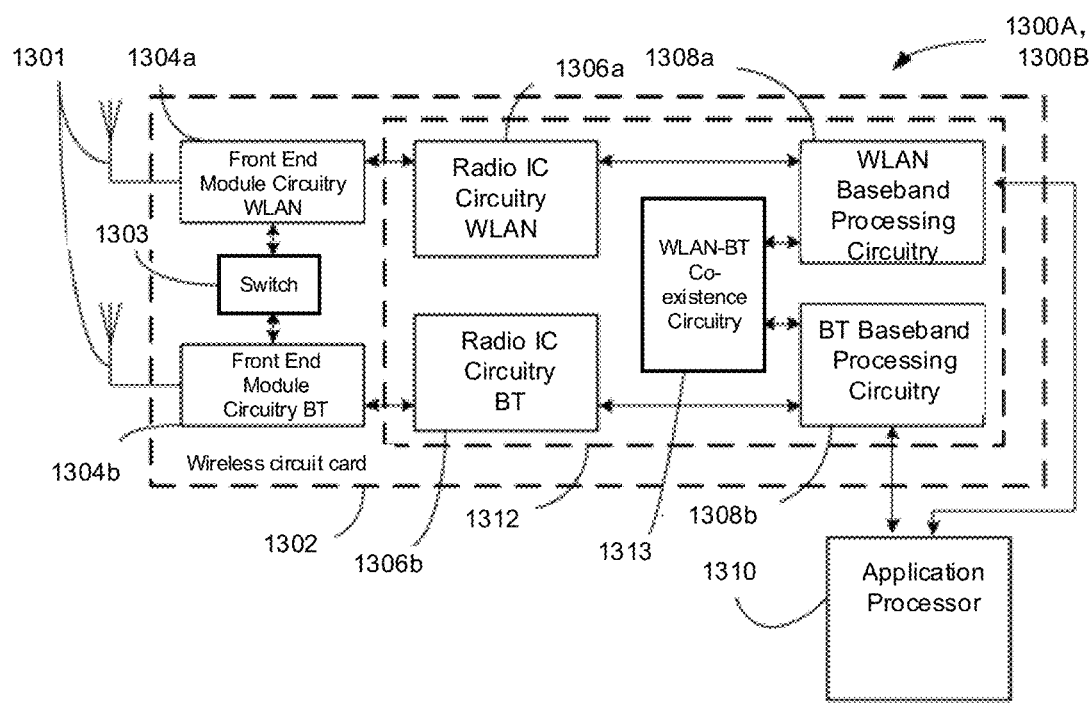
FIG. 13 is a block diagram of a radio architecture 1300A, 1300B in accordance with some embodiments that may be implemented in any one of APs 104 and/or the user devices 102 of FIG. 1.

FIG. 13 is a block diagram of a radio architecture 1300A, 1300B in accordance with some embodiments that may be implemented in any one of APs 104 and/or the user devices 102 of FIG. 1. Radio architecture 1300A, 1300B may include radio front-end module (FEM) circuitry 1304*a-b*, radio IC circuitry 1306*a-b* and baseband processing circuitry 1308*a-b*. Radio architecture 1300A, 1300B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304*a-b* may include a WLAN or Wi-Fi FEM circuitry 1304*a* and a Bluetooth (BT) FEM circuitry 1304*b*. The WLAN FEM circuitry 1304*a* may include a receive signal path comprising circuitry configured to operate on WLAN RF signals received from one or more antennas 1301, to amplify the received signals and to provide the amplified versions of the received signals to the WLAN radio IC circuitry 1306*a* for further processing. The BT FEM circuitry 1304*b* may include a receive signal path which may include circuitry configured to operate on BT RF signals received from one or more antennas 1301, to amplify the received signals and to provide the amplified versions of the received signals to the BT radio IC circuitry 1306*b* for further processing. FEM circuitry 1304*a* may also include a transmit signal path which may include circuitry configured to amplify WLAN signals provided by the radio IC circuitry

1306a for wireless transmission by one or more of the antennas 1301. In addition, FEM circuitry 1304b may also include a transmit signal path which may include circuitry configured to amplify BT signals provided by the radio IC circuitry 1306b for wireless transmission by the one or more antennas. In the embodiment of FIG. 13, although FEM 1304a and FEM 1304b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306a-b as shown may include WLAN radio IC circuitry 1306a and BT radio IC circuitry 1306b. The WLAN radio IC circuitry 1306a may include a receive signal path which may include circuitry to down-convert WLAN RF signals received from the FEM circuitry 1304a and provide baseband signals to WLAN baseband processing circuitry 1308a. BT radio IC circuitry 1306b may in turn include a receive signal path which may include circuitry to down-convert BT RF signals received from the FEM circuitry 1304b and provide baseband signals to BT baseband processing circuitry 1308b. WLAN radio IC circuitry 1306a may also include a transmit signal path which may include circuitry to up-convert WLAN baseband signals provided by the WLAN baseband processing circuitry 1308a and provide WLAN RF output signals to the FEM circuitry 1304a for subsequent wireless transmission by the one or more antennas 1301. BT radio IC circuitry 1306b may also include a transmit signal path which may include circuitry to up-convert BT baseband signals provided by the BT baseband processing circuitry 1308b and provide BT RF output signals to the FEM circuitry 1304b for subsequent wireless transmission by the one or more antennas 1301. In the embodiment of FIG. 13, although radio IC circuitries 1306a and 1306b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1308a-b may include a WLAN baseband processing circuitry 1308a and a BT baseband processing circuitry 1308b. The WLAN baseband processing circuitry 1308a may include a memory, such as, for example, a set of RAM arrays in a Fast Fourier Transform or Inverse Fast Fourier Transform block (not shown) of the WLAN baseband processing circuitry 1308a. Each of the WLAN baseband circuitry 1308a and the BT baseband circuitry 1308b may further include one or more processors and control logic to process the signals received from the corresponding WLAN or BT receive signal path of the radio IC circuitry 1306a-b, and to also generate corresponding WLAN or BT baseband signals for the transmit signal path of the radio IC circuitry 1306a-b. Each of the baseband processing circuitries 1308a and 1308b may further include physical layer (PHY) and medium access control layer (MAC) circuitry, and may further interface with a device for generation and processing of the baseband signals and for controlling operations of the radio IC circuitry 1306a-b.

Referring still to FIG. 13, according to the shown embodiment, WLAN-BT coexistence circuitry 1313 may include logic providing an interface between the WLAN baseband circuitry 1308a and the BT baseband circuitry 1308b to enable use cases requiring WLAN and BT coexistence. In addition, a switch 1303 may be provided between the WLAN FEM circuitry 1304a and the BT FEM circuitry 1304b to allow switching between the WLAN and BT radios according to application needs. In addition, although the antennas 1301 are depicted as being respectively connected to the WLAN FEM circuitry 1304a and the BT FEM circuitry 1304b, embodiments include within their scope the sharing of one or more antennas as between the WLAN and BT FEMs, or the provision of more than one antenna connected to each of FEM 1304a or 1304b.

In some embodiments, the front-end module circuitry 1304a-b, the radio IC circuitry 1306a-b, and baseband processing circuitry 1308a-b may be provided on a single radio card, such as wireless radio card 1302. In some other embodiments, the one or more antennas 1301, the FEM circuitry 1304a-b and the radio IC circuitry 1306a-b may be provided on a single radio card. In some other embodiments, the radio IC circuitry 1306a-b and the baseband processing circuitry 1308a-b may be provided on a single chip or integrated circuit (IC), such as IC 1312.

In some embodiments, the wireless radio card 1302 may include a WLAN radio card and may be configured for Wi-Fi communications, although the scope of the embodiments is not limited in this respect. In some of these embodiments, the radio architecture 1300A, 1300B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1300A, 1300B may be part of a Wi-Fi communication station (STA) such as a wireless access point (AP), a base station or a mobile device including a Wi-Fi device. In some of these embodiments, radio architecture 1300A, 1300B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 1300A, 1300B may also be suitable to transmit and/or receive communications in accordance with other techniques and standards.

In some embodiments, the radio architecture 1300A, 1300B may be configured for high-efficiency Wi-Fi (HEW) communications in accordance with the IEEE 802.11ax standard. In these embodiments, the radio architecture 1300A, 1300B may be configured to communicate in accordance with an OFDMA technique, although the scope of the embodiments is not limited in this respect.

In some other embodiments, the radio architecture 1300A, 1300B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 13, the BT baseband circuitry 1308b may be compliant with a Bluetooth (BT) connectivity standard such as Bluetooth, Bluetooth 8.0 or Bluetooth 6.0, or any other iteration of the Bluetooth Standard.

In some embodiments, the radio architecture 1300A, 1300B may include other radio cards, such as a cellular radio card configured for cellular (e.g., 5GPP such as LTE, LTE-Advanced or 5G communications).

In some IEEE 802.11 embodiments, the radio architecture 1300A, 1300B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 720 MHz channel bandwidth may be used. The scope of the embodiments is not limited with respect to the above center frequencies however.

Figure 14:
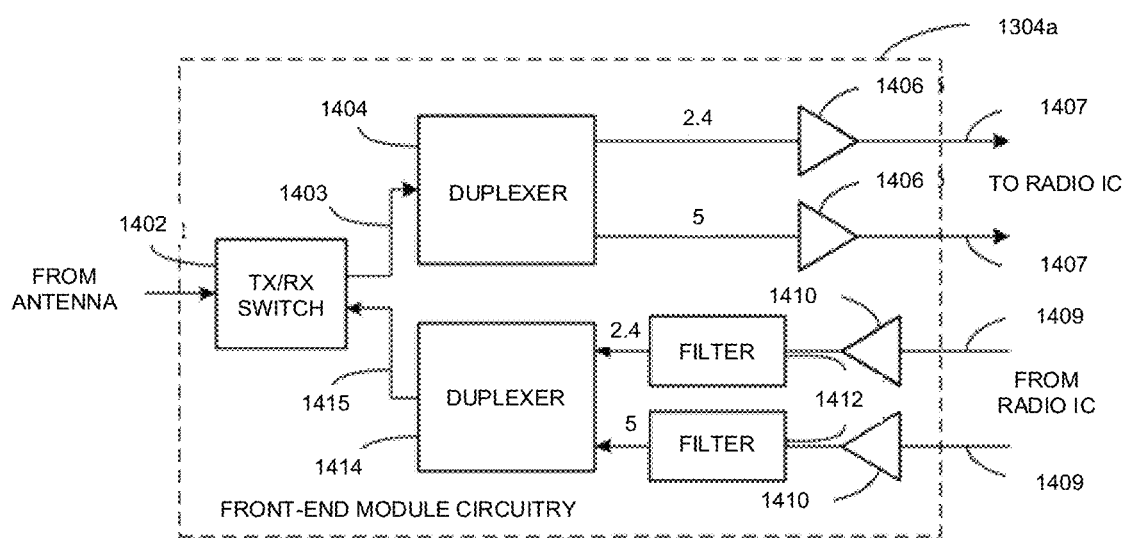
FIG. 14 illustrates WLAN FEM circuitry 1304a in accordance with some embodiments.

FIG. 14 illustrates WLAN FEM circuitry 1304a in accordance with some embodiments. Although the example of FIG. 14 is described in conjunction with the WLAN FEM circuitry 1304a, the example of FIG. 14 may be described in conjunction with the example BT FEM circuitry 1304b (FIG. 13), although other circuitry configurations may also be suitable.

In some embodiments, the FEM circuitry 1304a may include a TX/RX switch 1402 to switch between transmit mode and receive mode operation. The FEM circuitry 1304a may include a receive signal path and a transmit signal path. The receive signal path of the FEM circuitry 1304a may include a low-noise amplifier (LNA) 1406 to amplify received RF signals 1403 and provide the amplified received RF signals 1407 as an output (e.g., to the radio IC circuitry 1306a-b (FIG. 13)). The transmit signal path of the circuitry 1304a may include a power amplifier (PA) to amplify input RF signals 1409 (e.g., provided by the radio IC circuitry 1306a-b), and one or more filters 1412, such as band-pass filters (BPFs), low-pass filters (LPFs) or other types of filters, to generate RF signals 1415 for subsequent transmission (e.g., by one or more of the antennas 1301 (FIG. 13)) via an example duplexer 1414.

In some dual-mode embodiments for Wi-Fi communication, the FEM circuitry 1304a may be configured to operate in either the 2.4 GHz frequency spectrum or the 5 GHz frequency spectrum. In these embodiments, the receive signal path of the FEM circuitry 1304a may include a receive signal path duplexer 1404 to separate the signals from each spectrum as well as provide a separate LNA 1406 for each spectrum as shown. In these embodiments, the transmit signal path of the FEM circuitry 1304a may also include a power amplifier 1410 and a filter 1412, such as a BPF, an LPF or another type of filter for each frequency spectrum and a transmit signal path duplexer 1414 to provide the signals of one of the different spectrums onto a single transmit path for subsequent transmission by the one or more of the antennas 1301 (FIG. 13). In some embodiments, BT communications may utilize the 2.4 GHz signal paths and may utilize the same FEM circuitry 1304a as the one used for WLAN communications.

Figure 15:
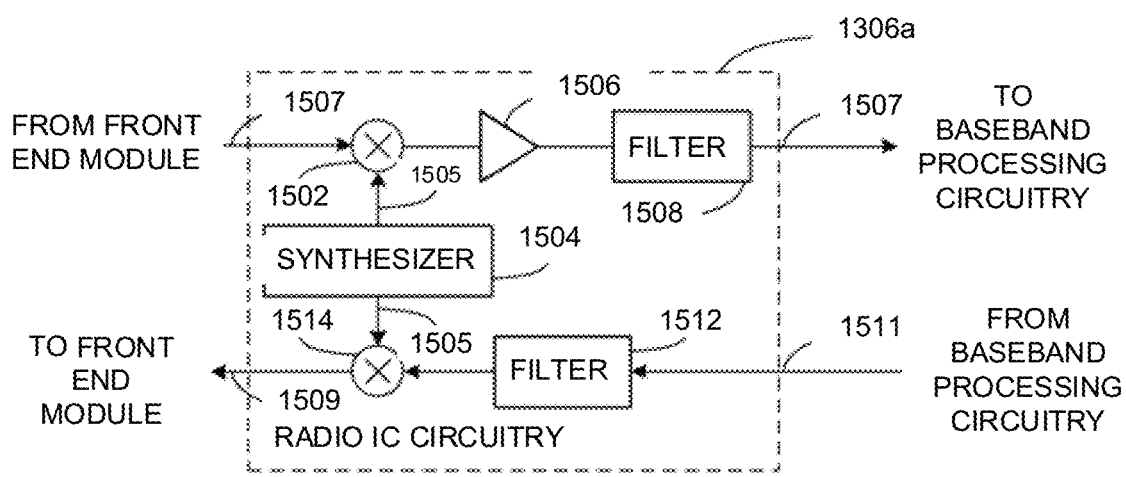
FIG. 15 illustrates radio IC circuitry 1306a in accordance with some embodiments.

FIG. 15 illustrates radio IC circuitry 1306a in accordance with some embodiments. The radio IC circuitry 1306a is one example of circuitry that may be suitable for use as the WLAN or BT radio IC circuitry 1306a/1306b (FIG. 13), although other circuitry configurations may also be suitable. Alternatively, the example of FIG. 15 may be described in conjunction with the example BT radio IC circuitry 1306b.

In some embodiments, the radio IC circuitry 1306a may include a receive signal path and a transmit signal path. The receive signal path of the radio IC circuitry 1306a may include at least mixer circuitry 1502, such as, for example, down-conversion mixer circuitry, amplifier circuitry 1506 and filter circuitry 1508. The transmit signal path of the radio IC circuitry 1306a may include at least filter circuitry 1512 and mixer circuitry 1514, such as, for example, up-conversion mixer circuitry. Radio IC circuitry 1306a may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 15 illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304a-b (FIG. 13) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308a-b (FIG. 13) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304a-b. The baseband signals 1511 may be provided by the baseband processing circuitry 1308a-b and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or up-conversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct up-conversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 15 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 15). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 14) may comprise a balanced signal, although the scope of the embodiments is not limited in this respect. The I and Q baseband output signals may be provided to low-noise amplifier, such as amplifier circuitry 1506 (FIG. 15) or to filter circuitry 1508 (FIG. 15).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1504 may be provided by a voltage controlled oscillator (VCO), although that is not a requirement. A divider control input may further be provided by either the baseband processing circuitry 1308a-b (FIG. 13) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example security signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

Figure 16:
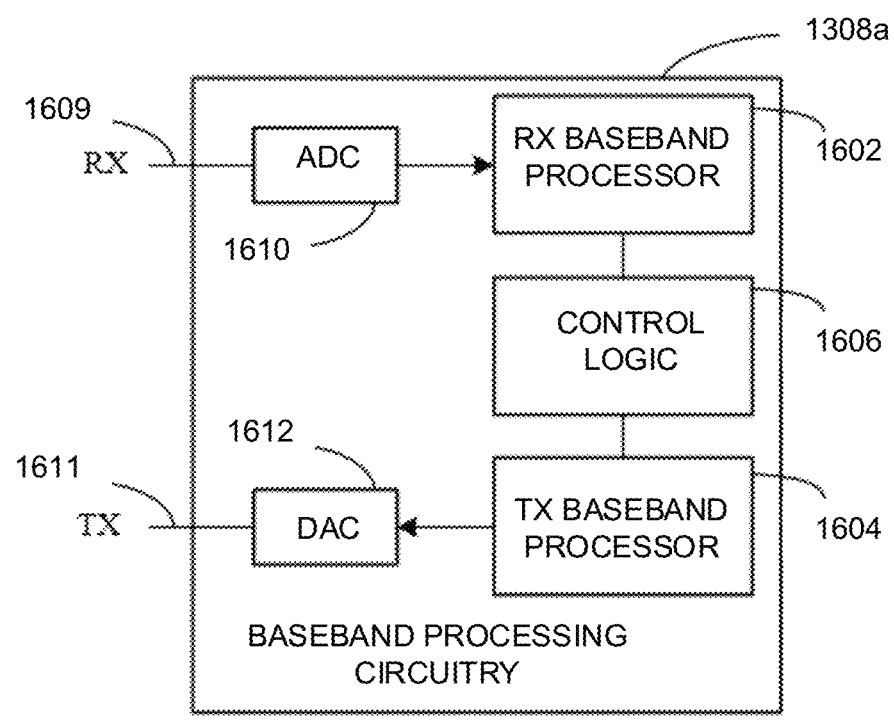
FIG. 16 illustrates a functional block diagram of baseband processing circuitry 1308a in accordance with some embodiments.

FIG. 16 illustrates a functional block diagram of baseband processing circuitry 1308a in accordance with some embodiments. The baseband processing circuitry 1308a is one example of circuitry that may be suitable for use as the baseband processing circuitry 1308a (FIG. 13), although other circuitry configurations may also be suitable. Alternatively, the example of FIG. 16 may be used to implement the example BT baseband processing circuitry 1308b of FIG. 13.

The baseband processing circuitry 1308a may include a receive baseband processor (RX BBP) 1602 for processing receive baseband signals 1609 provided by the radio IC circuitry 1306a-b (FIG. 13) and a transmit baseband processor (TX BBP) 1604 for generating transmit baseband signals 1611 for the radio IC circuitry 1306a-b. The baseband processing circuitry 1308a may also include control logic 1606 for coordinating the operations of the baseband processing circuitry 1308a.

In some embodiments (e.g., when analog baseband signals are exchanged between the baseband processing circuitry 1308a-b and the radio IC circuitry 1306a-b), the baseband processing circuitry 1308a may include ADC 1610 to convert analog baseband signals 1609 received from the radio IC circuitry 1306a-b to digital baseband signals for processing by the RX BBP 1602. In these embodiments, the baseband processing circuitry 1308a may also include DAC 1612 to convert digital baseband signals from the TX BBP 1604 to analog baseband signals 1611.

In some embodiments that communicate OFDM signals or OFDMA signals, such as through baseband processor 1308a, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 13, in some embodiments, the antennas 1301 (FIG. 13) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (IMO) embodiments, the antennas may be effectively separated to take advantage of spatial diversity and the different channel characteristics that may result. Antennas 1301 may each include a set of phased-array antennas, although embodiments are not so limited.

Although the radio architecture 1300A, 1300B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following paragraphs describe examples of various embodiments.

Example 1 includes an apparatus, comprising: interface circuitry; and processor circuitry coupled with the interface circuitry, wherein the processor circuitry is to: encode a Preemptable Physical Protocol Data Unit (P-PPDU) packet; and cause transmission of the P-PPDU packet to a Station (STA) via the interface circuitry, wherein the P-PPDU packet includes a plurality of Media Access Control (MAC) Protocol Data Unit (MPDU) segments of an Aggregated MPDU (A-MPDU), each MPDU segment includes one or more MPDUs, and wherein the P-PPDU packet includes a midamble (MA) for each MPDU segment.

Example 2 includes the apparatus of Example 1, wherein the processor circuitry is further to: postpone transmission of a MPDU segment of the P-PPDU packet when time-sensitive traffic arrives; and insert the time-sensitive traffic in the P-PPDU packet for transmission to a requesting STA of the time-sensitive traffic via the interface circuitry.

Example 3 includes the apparatus of Example 1 or 2, wherein the processor circuitry is further to: decode a request from the requesting STA, the request includes a latency and reliability requirement for the time-sensitive traffic; and schedule the postponing and inserting in response to the request.

Example 4 includes the apparatus of any of Examples 1 to 3, wherein the MA is to include: a preemption field to indicate a type of a preemption; a STA Identifier (ID) field to indicate a STA for which a MPDU segment associated with the MA is assigned; a segment length field to indicate a length of a MPDU segment associated with the MA; a Modulation and Coding Scheme (MCS) field to indicate a coding and modulation scheme for a MPDU segment associated with the MA; a padding field to indicate padding before insertion of a Wideband MA (WMA); a Cyclic Redundancy Check (CRC) field to detect decoding error; a Binary Convolutional Codes (BCC) padding field to flush BCC; or a delimiter signature field to detect presence of the MA.

Example 5 includes the apparatus of any of Examples 1 to 4, wherein the MPDU segment associated with the MA includes either time-sensitive traffic or non-time-sensitive traffic.

Example 6 includes the apparatus of any of Examples 1 to 5, wherein the P-PPDU packet is associated with a single STA.

Example 7 includes the apparatus of any of Examples 1 to 6, wherein the P-PPDU packet is associated with multiple STAs based on Orthogonal Frequency-Division Multiple Access (OFDMA), and wherein each of the multiple STAs is assign with a respective resource unit (RU) in frequency domain.

Example 8 includes the apparatus of any of Examples 1 to 7, wherein the MA is to include a preemption field to indicate a type of a preemption, wherein the type of the preemption includes a RU based preemption or a wideband based preemption.

Example 9 includes the apparatus of any of Examples 1 to 8, wherein the P-PPDU packet includes multiple A-MPDUs, and wherein each of the multiple STAs is associated with a respective one of the multiple A-MPDUs.

Example 10 includes the apparatus of any of Examples 1 to 9, wherein the P-PPDU packet further includes a Wideband MA (WMA) across the P-PPDU packet in the frequency domain.

Example 11 includes the apparatus of any of Examples 1 to 10, wherein the WMA is associated with one or more STAs.

Example 12 includes the apparatus of any of Examples 1 to 11, wherein the WMA is to include: a training field to allow a STA to perform wideband channel estimation; a user information field to indicate a RU allocation, a coding and modulation scheme, or a frame length for a MPDU segment associated with the WMA; a maximum segment length field to indicate a maximum length among MPDU segments associated with the WMA; a Modulation and Coding Scheme (MCS) field to indicate a coding and modulation scheme for a MPDU segment associated with the WMA; a Cyclic Redundancy Check (CRC) field to detect decoding error; or a Binary Convolutional Codes (BCC) padding field to indicate padding bits required to flush BCC.

Example 13 includes the apparatus of any of Examples 1 to 12, wherein the MPDU segment associated with the WMA includes time-sensitive traffic.

Example 14 includes the apparatus of any of Examples 1 to 13, wherein the processor circuitry includes a MAC logic and a Physical (PHY) logic, wherein the MAC logic is to: arrange a time-sensitive frame into a queue; provide, when the time-sensitive frame is ready for transmission and the P-PPDU packet is ongoing, the time-sensitive frame as a parameter to the PHY logic via a dedicated primitive, and wherein the PHY logic is to: preempt the P-PPDU packet to insert the time-sensitive frame.

Example 15 includes the apparatus of any of Examples 1 to 14, wherein the apparatus is apart of an Access Point (AP).

Example 16 includes an apparatus, comprising: interface circuitry; and processor circuitry coupled with the interface circuitry, wherein the processor circuitry is to: decode a Preemptable Physical Protocol Data Unit (P-PPDU) packet received from an Access Point (AP) via the interface circuitry, wherein the P-PPDU packet includes a plurality of Media Access Control (MAC) Protocol Data Unit (MPDU) segments of an Aggregated MPDU (A-MPDU), each MPDU segment includes one or more MPDUs, and wherein the P-PPDU packet includes a midamble (MA) for each MPDU segment; and determine, based on the MA, a target Station (STA) of a MPDU segment associated with the MA.

Example 17 includes the apparatus of Example 16, wherein the processor circuitry is further to: encode a request for time-sensitive traffic; cause transmission of the request to the AP via the interface circuitry; and decode, in response to the request, the P-PPDU packet for the time-sensitive traffic.

Example 18 includes the apparatus of Example 16 or 17, wherein the MPDU segment associated with the MA includes the time-sensitive traffic.

Example 19 includes the apparatus of any of Examples 16 to 18, wherein the processor circuitry is further to: pause processing of the P-PPDU packet when the MA indicates that the MPDU segment associated with the MA includes time-sensitive traffic.

Example 20 includes the apparatus of any of Examples 16 to 19, wherein the MA is to include: a preemption field to indicate a type of a preemption; a STA Identifier (ID) field to indicate a STA for which a MPDU segment associated with the MA is assigned; a segment length field to indicate a length of a MPDU segment associated with the MA; a Modulation and Coding Scheme (MCS) field to indicate a coding and modulation scheme for a MPDU segment associated with the MA; a padding field to indicate padding before insertion of a Wideband MA (WMA); a Cyclic Redundancy Check (CRC) field to detect decoding error; a Binary Convolutional Codes (BCC) padding field to flush BCC; or a delimiter signature field to detect presence of the MA.

Example 21 includes the apparatus of any of Examples 16 to 20, wherein the MPDU segment associated with the MA includes either time-sensitive traffic or non-time-sensitive traffic.

Example 22 includes the apparatus of any of Examples 16 to 21, wherein the P-PPDU packet is associated with a single STA.

Example 23 includes the apparatus of any of Examples 16 to 22, wherein the P-PPDU packet is associated with multiple STAs based on Orthogonal Frequency-Division Multiple Access (OFDMA), and wherein each of the multiple STAs is assign with a respective resource unit (RU) in frequency domain.

Example 24 includes the apparatus of any of Examples 16 to 23, wherein the MA is to include a preemption field to indicate a type of a preemption, wherein the type of the preemption includes a RU based preemption or a wideband based preemption.

Example 25 includes the apparatus of any of Examples 16 to 24, wherein the P-PPDU packet includes multiple A-MPDUs, and wherein each of the multiple STAs is associated with a respective one of the multiple A-MPDUs.

Example 26 includes the apparatus of any of Examples 16 to 25, wherein the P-PPDU packet further includes a Wideband MA (WMA) across the P-PPDU packet in the frequency domain.

Example 27 includes the apparatus of any of Examples 16 to 26, wherein the WMA is associated with one or more STAs.

Example 28 includes the apparatus of any of Examples 16 to 27, wherein the WMA is to include: a training field to allow a STA to perform wideband channel estimation; a user information field to indicate a RU allocation, a coding and modulation scheme, or a frame length for a MPDU segment associated with the WMA; a maximum segment length field to indicate a maximum length among MPDU segments associated with the WMA; a Modulation and Coding Scheme (MCS) field to indicate a coding and modulation scheme for a MPDU segment associated with the WMA; a Cyclic Redundancy Check (CRC) field to detect decoding error; or a Binary Convolutional Codes (BCC) padding field to indicate padding bits required to flush BCC.

Example 29 includes the apparatus of any of Examples 16 to 28, wherein the MPDU segment associated with the WMA includes time-sensitive traffic.

Example 30 includes the apparatus of any of Examples 16 to 29, wherein the apparatus is apart of a Station (STA).

Example 31 includes a method, comprising: encoding a Preemptable Physical Protocol Data Unit (P-PPDU) packet; and transmitting the P-PPDU packet to a Station (STA), wherein the P-PPDU packet includes a plurality of Media Access Control (MAC) Protocol Data Unit (MPDU) segments of an Aggregated MPDU (A-MPDU), each MPDU segment includes one or more MPDUs, and wherein the P-PPDU packet includes a midamble (MA) for each MPDU segment.

Example 32 includes the method of Example 31, further comprising: postponing transmission of a MPDU segment of the P-PPDU packet when time-sensitive traffic arrives; and inserting the time-sensitive traffic in the P-PPDU packet for transmission to a requesting STA of the time-sensitive traffic.

Example 33 includes the method of Example 31 or 32, further comprising: decoding a request from the requesting STA, the request includes a latency and reliability requirement for the time-sensitive traffic; and scheduling the postponing and inserting in response to the request.

Example 34 includes the method of any of Examples 31 to 33, wherein the MA is to include: a preemption field to indicate a type of a preemption; a STA Identifier (ID) field to indicate a STA for which a MPDU segment associated with the MA is assigned; a segment length field to indicate a length of a MPDU segment associated with the MA; a Modulation and Coding Scheme (MCS) field to indicate a coding and modulation scheme for a MPDU segment associated with the MA; a padding field to indicate padding before insertion of a Wideband MA (WMA); a Cyclic Redundancy Check (CRC) field to detect decoding error; a Binary Convolutional Codes (BCC) padding field to flush BCC; or a delimiter signature field to detect presence of the MA.

Example 35 includes the method of any of Examples 31 to 34, wherein the MPDU segment associated with the MA includes either time-sensitive traffic or non-time-sensitive traffic.

Example 36 includes the method of any of Examples 31 to 35, wherein the P-PPDU packet is associated with a single STA.

Example 37 includes the method of any of Examples 31 to 36, wherein the P-PPDU packet is associated with multiple STAs based on Orthogonal Frequency-Division Multiple Access (OFDMA), and wherein each of the multiple STAs is assign with a respective resource unit (RU) in frequency domain.

Example 38 includes the method of any of Examples 31 to 37, wherein the MA is to include a preemption field to indicate a type of a preemption, wherein the type of the preemption includes a RU based preemption or a wideband based preemption.

Example 39 includes the method of any of Examples 31 to 38, wherein the P-PPDU packet includes multiple A-MPDUs, and wherein each of the multiple STAs is associated with a respective one of the multiple A-MPDUs.

Example 40 includes the method of any of Examples 31 to 39, wherein the P-PPDU packet further includes a Wideband MA (WMA) across the P-PPDU packet in the frequency domain.

Example 41 includes the method of any of Examples 31 to 40, wherein the WMA is associated with one or more STAs.

Example 42 includes the method of any of Examples 31 to 41, wherein the WMA is to include: a training field to allow a STA to perform wideband channel estimation; a user information field to indicate a RU allocation, a coding and modulation scheme, or a frame length for a MPDU segment associated with the WMA; a maximum segment length field to indicate a maximum length among MPDU segments associated with the WMA; a Modulation and Coding Scheme (MCS) field to indicate a coding and modulation scheme for a MPDU segment associated with the WMA; a Cyclic Redundancy Check (CRC) field to detect decoding error; or a Binary Convolutional Codes (BCC) padding field to indicate padding bits required to flush BCC.

Example 43 includes the method of any of Examples 31 to 42, wherein the MPDU segment associated with the WMA includes time-sensitive traffic.

Example 44 includes the method of any of Examples 31 to 43, further comprising: arranging a time-sensitive frame into a queue; providing, when the time-sensitive frame is ready for transmission and the P-PPDU packet is ongoing, the time-sensitive frame as a parameter to a Physical (PHY) logic from a MAC logic via a dedicated primitive; and preempting, by the PHY logic, the P-PPDU packet to insert the time-sensitive frame.

Example 45 includes the method of any of Examples 31 to 44, wherein the method is implemented by an Access Point (AP).

Example 46 includes an method, comprising: decoding a Preemptable Physical Protocol Data Unit (P-PPDU) packet received from an Access Point (AP), wherein the P-PPDU packet includes a plurality of Media Access Control (MAC) Protocol Data Unit (MPDU) segments of an Aggregated MPDU (A-MPDU), each MPDU segment includes one or more MPDUs, and wherein the P-PPDU packet includes a midamble (MA) for each MPDU segment; and determining, based on the MA, a target Station (STA) of a MPDU segment associated with the MA.

Example 47 includes the method of Example 46, further comprising: encoding a request for time-sensitive traffic; transmitting the request to the AP; and decoding, in response to the request, the P-PPDU packet for the time-sensitive traffic.

Example 48 includes the method of Example 46 or 47, wherein the MPDU segment associated with the MA includes the time-sensitive traffic.

Example 49 includes the method of any of Examples 46 to 48, further comprising: pausing processing of the P-PPDU packet when the MA indicates that the MPDU segment associated with the MA includes time-sensitive traffic.

Example 50 includes the method of any of Examples 46 to 49, wherein the MA is to include: a preemption field to indicate a type of a preemption; a STA Identifier (ID) field to indicate a STA for which a MPDU segment associated with the MA is assigned; a segment length field to indicate a length of a MPDU segment associated with the MA; a Modulation and Coding Scheme (MCS) field to indicate a coding and modulation scheme for a MPDU segment associated with the MA; a padding field to indicate padding before insertion of a Wideband MA (WMA); a Cyclic Redundancy Check (CRC) field to detect decoding error; a Binary Convolutional Codes (BCC) padding field to flush BCC; or a delimiter signature field to detect presence of the MA.

Example 51 includes the method of any of Examples 46 to 50, wherein the MPDU segment associated with the MA includes either time-sensitive traffic or non-time-sensitive traffic.

Example 52 includes the method of any of Examples 46 to 51, wherein the P-PPDU packet is associated with a single STA.

Example 53 includes the method of any of Examples 46 to 52, wherein the P-PPDU packet is associated with multiple STAs based on Orthogonal Frequency-Division Multiple Access (OFDMA), and wherein each of the multiple STAs is assign with a respective resource unit (RU) in frequency domain.

Example 54 includes the method of any of Examples 46 to 53, wherein the MA is to include a preemption field to indicate a type of a preemption, wherein the type of the preemption includes a RU based preemption or a wideband based preemption.

Example 55 includes the method of any of Examples 46 to 54, wherein the P-PPDU packet includes multiple A-MPDUs, and wherein each of the multiple STAs is associated with a respective one of the multiple A-MPDUs.

Example 56 includes the method of any of Examples 46 to 55, wherein the P-PPDU packet further includes a Wideband MA (WMA) across the P-PPDU packet in the frequency domain.

Example 57 includes the method of any of Examples 46 to 56, wherein the WMA is associated with one or more STAs.

Example 58 includes the method of any of Examples 46 to 57, wherein the WMA is to include: a training field to allow a STA to perform wideband channel estimation; a user information field to indicate a RU allocation, a coding and modulation scheme, or a frame length for a MPDU segment associated with the WMA; a maximum segment length field to indicate a maximum length among MPDU segments associated with the WMA; a Modulation and Coding Scheme (MCS) field to indicate a coding and modulation scheme for a MPDU segment associated with the WMA; a Cyclic Redundancy Check (CRC) field to detect decoding error; or a Binary Convolutional Codes (BCC) padding field to indicate padding bits required to flush BCC.

Example 59 includes the method of any of Examples 46 to 58, wherein the MPDU segment associated with the WMA includes time-sensitive traffic.

Example 60 includes the method of any of Examples 46 to 59, wherein the method is implemented by a Station (STA).

Example 61 includes an apparatus, comprising: means for encoding a Preemptable Physical Protocol Data Unit (P-PPDU) packet; and means for transmitting the P-PPDU packet to a Station (STA), wherein the P-PPDU packet includes a plurality of Media Access Control (MAC) Protocol Data Unit (MPDU) segments of an Aggregated MPDU (A-MPDU), each MPDU segment includes one or more MPDUs, and wherein the P-PPDU packet includes a midamble (MA) for each MPDU segment.

Example 62 includes the apparatus of Example 61, further comprising: means for postponing transmission of a MPDU segment of the P-PPDU packet when time-sensitive traffic arrives; and means for inserting the time-sensitive traffic in the P-PPDU packet for transmission to a requesting STA of the time-sensitive traffic.

Example 63 includes the apparatus of Example 61 or 62, further comprising: means for decoding a request from the requesting STA, the request includes a latency and reliability requirement for the time-sensitive traffic; and means for scheduling the postponing and inserting in response to the request.

Example 64 includes the apparatus of any of Examples 61 to 63, wherein the MA is to include: a preemption field to indicate a type of a preemption; a STA Identifier (ID) field to indicate a STA for which a MPDU segment associated with the MA is assigned; a segment length field to indicate a length of a MPDU segment associated with the MA; a Modulation and Coding Scheme (MCS) field to indicate a coding and modulation scheme for a MPDU segment associated with the MA; a padding field to indicate padding before insertion of a Wideband MA (WMA); a Cyclic Redundancy Check (CRC) field to detect decoding error; a Binary Convolutional Codes (BCC) padding field to flush BCC; or a delimiter signature field to detect presence of the MA.

Example 65 includes the apparatus of any of Examples 61 to 64, wherein the MPDU segment associated with the MA includes either time-sensitive traffic or non-time-sensitive traffic.

Example 66 includes the apparatus of any of Examples 61 to 65, wherein the P-PPDU packet is associated with a single STA.

Example 67 includes the apparatus of any of Examples 61 to 66, wherein the P-PPDU packet is associated with multiple STAs based on Orthogonal Frequency-Division Multiple Access (OFDMA), and wherein each of the multiple STAs is assign with a respective resource unit (RU) in frequency domain.

Example 68 includes the apparatus of any of Examples 61 to 67, wherein the MA is to include a preemption field to indicate a type of a preemption, wherein the type of the preemption includes a RU based preemption or a wideband based preemption.

Example 69 includes the apparatus of any of Examples 61 to 68, wherein the P-PPDU packet includes multiple A-MPDUs, and wherein each of the multiple STAs is associated with a respective one of the multiple A-MPDUs.

Example 70 includes the apparatus of any of Examples 61 to 69, wherein the P-PPDU packet further includes a Wideband MA (WMA) across the P-PPDU packet in the frequency domain.

Example 71 includes the apparatus of any of Examples 61 to 70, wherein the WMA is associated with one or more STAs.

Example 72 includes the apparatus of any of Examples 61 to 71, wherein the WMA is to include: a training field to allow a STA to perform wideband channel estimation; a user information field to indicate a RU allocation, a coding and modulation scheme, or a frame length for a MPDU segment associated with the WMA; a maximum segment length field to indicate a maximum length among MPDU segments associated with the WMA; a Modulation and Coding Scheme (MCS) field to indicate a coding and modulation scheme for a MPDU segment associated with the WMA; a Cyclic Redundancy Check (CRC) field to detect decoding error; or a Binary Convolutional Codes (BCC) padding field to indicate padding bits required to flush BCC.

Example 73 includes the apparatus of any of Examples 61 to 72, wherein the MPDU segment associated with the WMA includes time-sensitive traffic.

Example 74 includes the apparatus of any of Examples 61 to 73, further comprising: means for arranging a time-sensitive frame into a queue; means for providing, when the time-sensitive frame is ready for transmission and the P-PPDU packet is ongoing, the time-sensitive frame as a parameter to a Physical (PHY) logic from a MAC logic via a dedicated primitive; and means for preempting, by the PITY logic, the P-PPDU packet to insert the time-sensitive frame.

Example 75 includes the apparatus of any of Examples 61 to 74, wherein the apparatus is a part of an Access Point (AP).

Example 76 includes an apparatus, comprising: means for decoding a Preemptable Physical Protocol Data Unit (P-PPDU) packet received from an Access Point (AP), wherein the P-PPDU packet includes a plurality of Media Access Control (MAC) Protocol Data Unit (MPDU) segments of an Aggregated MPDU (A-MPDU), each MPDU segment includes one or more MPDUs, and wherein the P-PPDU packet includes a midamble (MA) for each MPDU segment; and means for determining, based on the MA, a target Station (STA) of a MPDU segment associated with the MA.

Example 77 includes the apparatus of Example 76, further comprising: means for encoding a request for time-sensitive traffic; means for transmitting the request to the AP; and means for decoding, in response to the request, the P-PPDU packet for the time-sensitive traffic.

Example 78 includes the apparatus of Example 76 or 77, wherein the MPDU segment associated with the MA includes the time-sensitive traffic.

Example 79 includes the apparatus of any of Examples 76 to 78, further comprising: means for pausing processing of the P-PPDU packet when the MA indicates that the MPDU segment associated with the MA includes time-sensitive traffic.

Example 80 includes the apparatus of any of Examples 76 to 79, wherein the MA is to include: a preemption field to indicate a type of a preemption; a STA Identifier (ID) field to indicate a STA for which a MPDU segment associated with the MA is assigned; a segment length field to indicate a length of a MPDU segment associated with the MA; a Modulation and Coding Scheme (MCS) field to indicate a coding and modulation scheme for a MPDU segment associated with the MA; a padding field to indicate padding before insertion of a Wideband MA (WMA); a Cyclic Redundancy Check (CRC) field to detect decoding error; a Binary Convolutional Codes (BCC) padding field to flush BCC; or a delimiter signature field to detect presence of the MA.

Example 81 includes the apparatus of any of Examples 76 to 80, wherein the MPDU segment associated with the MA includes either time-sensitive traffic or non-time-sensitive traffic.

Example 82 includes the apparatus of any of Examples 76 to 81, wherein the P-PPDU packet is associated with a single STA.

Example 83 includes the apparatus of any of Examples 76 to 82, wherein the P-PPDU packet is associated with multiple STAs based on Orthogonal Frequency-Division Multiple Access (OFDMA), and wherein each of the multiple STAs is assign with a respective resource unit (RU) in frequency domain.

Example 84 includes the apparatus of any of Examples 76 to 83, wherein the MA is to include a preemption field to indicate a type of a preemption, wherein the type of the preemption includes a RU based preemption or a wideband based preemption.

Example 85 includes the apparatus of any of Examples 76 to 84, wherein the P-PPDU packet includes multiple A-MPDUs, and wherein each of the multiple STAs is associated with a respective one of the multiple A-MPDUs.

Example 86 includes the apparatus of any of Examples 76 to 85, wherein the P-PPDU packet further includes a Wideband MA (WMA) across the P-PPDU packet in the frequency domain.

Example 87 includes the apparatus of any of Examples 76 to 86, wherein the WMA is associated with one or more STAs.

Example 88 includes the apparatus of any of Examples 76 to 87, wherein the WMA is to include: a training field to allow a STA to perform wideband channel estimation; a user information field to indicate a RU allocation, a coding and modulation scheme, or a frame length for a MPDU segment associated with the WMA; a maximum segment length field to indicate a maximum length among MPDU segments associated with the WMA; a Modulation and Coding Scheme (MCS) field to indicate a coding and modulation scheme for a MPDU segment associated with the WMA; a Cyclic Redundancy Check (CRC) field to detect decoding error; or a Binary Convolutional Codes (BCC) padding field to indicate padding bits required to flush BCC.

Example 89 includes the apparatus of any of Examples 76 to 88, wherein the MPDU segment associated with the WMA includes time-sensitive traffic.

Example 90 includes the apparatus of any of Examples 76 to 89, wherein the apparatus is a part of a Station (STA).

Example 91 includes a computer-readable medium having instructions stored thereon, the instructions when executed by processor circuitry cause the processor circuitry to perform the method of any of Examples 31 to 60.

Example 92 includes a Wireless Fidelity (Wi-Fi) device as shown and described in the description.

Example 93 includes a method performed at a Wireless Fidelity (Wi-Fi) device as shown and described in the description.

Example 94 includes a Station (STA) as shown and described in the description.

Example 95 includes a method performed at a Station (STA) as shown and described in the description.

Example 96 includes an Access Point (AP) as shown and described in the description.

Example 97 includes a method performed at an Access Point (AP) as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the disclosure. This application is intended to cover any adaptations or variations of the embodiments discussed herein. Therefore, it is manifestly intended that embodiments described herein be limited only by the appended claims and the equivalents thereof.

What is claimed is:

1. An apparatus, comprising:
   interface circuitry; and
   processor circuitry coupled with the interface circuitry, wherein the processor circuitry is to:
      encode a Preemptable Physical Protocol Data Unit (P-PPDU) packet; and
      cause transmission of the P-PPDU packet to multiple Stations (STAs) from an Access Point (AP) via the interface circuitry,
      wherein the P-PPDU packet includes a plurality of Media Access Control (MAC) Protocol Data Unit (MPDU) segments of an Aggregated MPDU (A-MPDU), each MPDU segment includes one or more MPDUs, and wherein the P-PPDU packet includes a midamble (MA) for each MPDU segment,
      wherein the P-PPDU packet is associated with the multiple STAs based on Orthogonal Frequency-Division Multiple Access (OFDMA), each of the multiple STAs is assign with a respective resource unit (RU) in frequency domain, and the P-PPDU packet further includes a single Wideband MA (WMA) for the multiple STAs across the P-PPDU packet in the frequency domain,
   wherein the processor circuitry is further to:
      postpone the transmission of the P-PPDU packet when time-sensitive traffic arrives;
      insert the time-sensitive traffic after the WMA for transmission to a requesting STA of the time-sensitive traffic via the interface circuitry, wherein the WMA indicates that the P-PPDU packet will be preempted by the time-sensitive traffic, and the WMA further indicates a new resource allocation for transmission of subsequent part of the P-PPDU packet for the multiple STAs after the transmission of the time-sensitive traffic is completed; and
      resume, after the transmission of the time-sensitive traffic is completed, the transmission of the subsequent part of the P-PPDU packet to the multiple STAs based on the new resource allocation.

2. The apparatus of claim 1, wherein the processor circuitry is further to:
   decode a request from the requesting STA, the request includes a latency and reliability requirement for the time-sensitive traffic; and
   schedule the postponing and inserting in response to the request.

3. The apparatus of claim 1, wherein the MA is to include:
   a preemption field to indicate a type of a preemption;
   a STA Identifier (ID) field to indicate a STA for which a MPDU segment associated with the MA is assigned;
   a segment length field to indicate a length of a MPDU segment associated with the MA;
   a Modulation and Coding Scheme (MCS) field to indicate a coding and modulation scheme for a MPDU segment associated with the MA;
   a padding field to indicate padding before insertion of a Wideband MA (WMA);
   a Cyclic Redundancy Check (CRC) field to detect decoding error;
   a Binary Convolutional Codes (BCC) padding field to flush BCC; or
   a delimiter signature field to detect presence of the MA.

4. The apparatus of claim 3, wherein the MPDU segment associated with the MA includes either the time-sensitive traffic or non-time-sensitive traffic.

5. The apparatus of claim 1, wherein the MA is to include a preemption field to indicate a type of a preemption, wherein the type of the preemption includes a RU based preemption or a wideband based preemption.

6. The apparatus of claim 1, wherein the P-PPDU packet includes multiple A-MPDUs, and wherein each of the multiple STAs is associated with a respective one of the multiple A-MPDUs.

7. The apparatus of claim 1, wherein the WMA is associated with one or more STAs.

8. The apparatus of claim 1, wherein the WMA is to include:
   a training field to allow a STA to perform wideband channel estimation;
   a user information field to indicate a RU allocation, a coding and modulation scheme, or a frame length for a MPDU segment associated with the WMA;
   a maximum segment length field to indicate a maximum length among MPDU segments associated with the WMA;
   a Modulation and Coding Scheme (MCS) field to indicate a coding and modulation scheme for a MPDU segment associated with the WMA;
   a Cyclic Redundancy Check (CRC) field to detect decoding error; or
   a Binary Convolutional Codes (BCC) padding field to indicate padding bits required to flush BCC.

9. The apparatus of claim 8, wherein the MPDU segment associated with the WMA includes the time-sensitive traffic.

10. The apparatus of claim 1, wherein the processor circuitry includes a MAC logic and a Physical (PHY) logic, wherein the MAC logic is to:
    arrange a time-sensitive frame into a queue;
    provide, when the time-sensitive frame is ready for transmission and the P-PPDU packet is ongoing, the time-sensitive frame as a parameter to the PHY logic via a dedicated primitive, and
    wherein the PHY logic is to:

preempt the P-PPDU packet to insert the time-sensitive frame.

11. An apparatus, comprising:

interface circuitry; and processor circuitry coupled with the interface circuitry, wherein the processor circuitry is to:

decode a Preemptable Physical Protocol Data Unit (P-PPDU) packet received from an Access Point (AP) via the interface circuitry, wherein the P-PPDU packet includes a plurality of Media Access Control (MAC) Protocol Data Unit (MPDU) segments of an Aggregated MPDU (A-MPDU), each MPDU segment includes one or more MPDUs, and wherein the P-PPDU packet includes a midamble (MA) for each MPDU segment; and determine, based on the MA, a target Station (STA) of a MPDU segment associated with the MA, wherein the P-PPDU packet is associated with multiple STAs based on Orthogonal Frequency-Division Multiple Access (OFDMA), each of the multiple STAs is assign with a respective resource unit (RU) in frequency domain, and the P-PPDU packet further includes a single Wideband MA (WMA) for the multiple STAs across the P-PPDU packet in the frequency domain, and wherein the WMA indicates that the P-PPDU packet will be preemptied by time-sensitive traffic, and the WMA further indicates a new resource allocation for transmission of subsequent part of the P-PPDU packet for the multiple STAs after transmission of the time-sensitive traffic is completed, and wherein the processor circuitry is to:

postpone the decoding of the P-PPDU packet according to the WMA; and resume, after the transmission of the time-sensitive traffic is completed, the decoding of the subsequent part of the P-PPDU packet based on the new resource allocation.

12. The apparatus of claim 11, wherein the processor circuitry is further to:

encode a request for time-sensitive traffic;

cause transmission of the request to the AP via the interface circuitry; and decode, in response to the request, the P-PPDU packet for the time-sensitive traffic.

13. The apparatus of claim 12, wherein the MPDU segment associated with the MA includes the time-sensitive traffic.

14. The apparatus of claim 11, wherein the processor circuitry is further to:

pause processing of the P-PPDU packet when the MA indicates that the MPDU segment associated with the MA includes the time-sensitive traffic.

15. The apparatus of claim 11, wherein the MA is to include:

a preemption field to indicate a type of a preemption;

a STA Identifier (ID) field to indicate a STA for which a MPDU segment associated with the MA is assigned;

a segment length field to indicate a length of a MPDU segment associated with the MA;

a Modulation and Coding Scheme (MCS) field to indicate a coding and modulation scheme for a MPDU segment associated with the MA;

a padding field to indicate padding before insertion of a Wideband MA (WMA);

a Cyclic Redundancy Check (CRC) field to detect decoding error;

a Binary Convolutional Codes (BCC) padding field to flush BCC; or a delimiter signature field to detect presence of the MA.

16. The apparatus of claim 11, wherein the MPDU segment associated with the MA includes either the time-sensitive traffic or non-time-sensitive traffic.

17. The apparatus of claim 11, wherein the MA is to include a preemption field to indicate a type of a preemption, wherein the type of the preemption includes a RU based preemption or a wideband based preemption.

18. The apparatus of claim 11, wherein the P-PPDU packet includes multiple A-MPDUs, and wherein each of the multiple STAs is associated with a respective one of the multiple A-MPDUs.

\* \* \* \* \*